US011137978B2

(12) United States Patent
Lee et al.

(10) Patent No.: US 11,137,978 B2
(45) Date of Patent: Oct. 5, 2021

(54) METHOD FOR OPERATING SPEECH RECOGNITION SERVICE AND ELECTRONIC DEVICE SUPPORTING THE SAME

(71) Applicant: Samsung Electronics Co., Ltd, Suwon-si (KR)

(72) Inventors: Kwang Yong Lee, Suwon-si (KR); Jung Hoe Kim, Seongnam-si (KR); Soo Bin Park, Suwon-si (KR); Kyoung Gu Woo, Seoul (KR); Seong Min Je, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 29 days.

(21) Appl. No.: 15/965,586

(22) Filed: Apr. 27, 2018

(65) Prior Publication Data
US 2018/0314490 A1 Nov. 1, 2018

(30) Foreign Application Priority Data
Apr. 27, 2017 (KR) .................... 10-2017-0054216

(51) Int. Cl.
| | |
|---|---|
| *G06F 3/16* | (2006.01) |
| *G10L 15/22* | (2006.01) |
| *G06F 3/0484* | (2013.01) |
| *G10L 15/18* | (2013.01) |
| *G06F 40/30* | (2020.01) |

(52) U.S. Cl.
CPC .......... *G06F 3/167* (2013.01); *G06F 3/04842* (2013.01); *G06F 40/30* (2020.01); *G10L 15/1815* (2013.01); *G10L 15/1822* (2013.01); *G10L 15/22* (2013.01); *G10L 2015/223* (2013.01); *G10L 2015/225* (2013.01)

(58) Field of Classification Search
CPC ............ G06F 3/04842; G06F 17/2785; G10L 15/1815; G10L 15/1822; G10L 15/22; G10L 2015/223; G10L 2015/225
See application file for complete search history.

(56) References Cited

U.S. PATENT DOCUMENTS

| | | | |
|---|---|---|---|
| 9,361,884 B2 | 6/2016 | Gandrabur et al. | |
| 9,424,840 B1* | 8/2016 | Hart ....................... | G10L 15/22 |
| 9,542,441 B1 | 1/2017 | Buchanan et al. | |

(Continued)

FOREIGN PATENT DOCUMENTS

KR  10-2016-0045352 A  4/2016

*Primary Examiner* — Mandrita Brahmachari

(57) ABSTRACT

An electronic device includes a processor, and a memory. The memory may store instructions that, cause the processor to display a user interface including items, receive a first user utterance while the user interface is displayed, wherein the first user utterance includes a first request for executing a first task by using at least one item, transmit first data related to the first user utterance to an external server, receive a first response from the external server, wherein the first response includes information on a first sequence of states of the electronic device for executing the first task and further includes numbers and locations of the items in the user interface, and execute the first task including an operation of allowing the application program to select the one or the plurality of items based on the numbers or the locations.

18 Claims, 20 Drawing Sheets

(56) References Cited

U.S. PATENT DOCUMENTS

| | | | |
|---|---|---|---|
| 10,026,394 B1* | 7/2018 | Carbon | G10L 21/06 |
| 2010/0318357 A1* | 12/2010 | Istvan | H04N 5/4403 |
| | | | 704/251 |
| 2012/0158400 A1* | 6/2012 | Schmidt | G06F 17/2785 |
| | | | 704/9 |
| 2013/0036124 A1* | 2/2013 | Ambwani | G06F 16/7844 |
| | | | 707/749 |
| 2013/0110520 A1* | 5/2013 | Cheyer | G06F 16/3329 |
| | | | 704/275 |
| 2013/0144629 A1* | 6/2013 | Johnston | G06F 3/167 |
| | | | 704/275 |
| 2013/0275138 A1* | 10/2013 | Gruber | G10L 13/00 |
| | | | 704/260 |
| 2014/0195248 A1 | 7/2014 | Chung et al. | |
| 2014/0257792 A1* | 9/2014 | Gandrabur | G10L 15/1815 |
| | | | 704/9 |
| 2014/0316768 A1* | 10/2014 | Khandekar | G06F 16/3329 |
| | | | 704/9 |
| 2014/0350941 A1* | 11/2014 | Zeigler | G10L 21/10 |
| | | | 704/275 |
| 2016/0034253 A1 | 2/2016 | Bang et al. | |
| 2016/0110158 A1* | 4/2016 | Park | G06F 3/167 |
| | | | 715/708 |
| 2017/0256256 A1* | 9/2017 | Wang | G10L 15/30 |
| 2018/0113672 A1* | 4/2018 | Klein | G06F 3/04883 |
| 2018/0284954 A1* | 10/2018 | Alcorn | G06F 3/0482 |

* cited by examiner

METHOD FOR OPERATING SPEECH RECOGNITION SERVICE AND ELECTRONIC DEVICE SUPPORTING THE SAME

CROSS-REFERENCE TO RELATED APPLICATION(S) AND CLAIM OF PRIORITY

This application is based on and claims priority under 35 U.S.C. § 119 to Korean Patent Application No. 10-2017-0054216 filed on Apr. 27, 2017 in the Korean Intellectual Property Office, the disclosure of which is incorporated by reference herein its entirety.

TECHNICAL FIELD

The present disclosure relates to a technology of operating a speech recognition service.

BACKGROUND

The recent electronic devices have suggested input schemes of various aspects as a part for aiming at interactions with the users. For example, the electronic devices may operate speech input schemes, through which speech data according to the utterances of the users are input, based on the executions of specific applications. Moreover, the electronic devices may derive intentions of utterances of the users by recognizing the input speech data and may support speech recognition services that perform operations corresponding to the derived intentions of the utterances.

The above information is presented as background information only to assist with an understanding of the present disclosure. No determination has been made, and no assertion is made, as to whether any of the above might be applicable as prior art with regard to the present disclosure.

SUMMARY

As the speech recognition services have become commercialized, the conveniences of the users for functional control of the electronic devices have improved. Correspondingly, the utterances of the users come to involve information resources (e.g., wordings) that are more routine and general, and for example, may include the anaphora (e.g., this, that, or it) included on the utterances of the users or the ordinals (e.g., the first, the second, or the third). However, the information resources may be applied as ambiguous factors when the intentions of the utterances of the users based on the syntactic or semantic analyses are derived.

The present disclosure provides a method for operating a speech recognition service by which an utterance of the user may be processed with a high reliability by suitably processing anaphora or ordinals on the utterance of the user, and an electronic device supporting the same.

According to an embodiment, an electronic device may include a housing, a touchscreen display disposed in an interior of the housing and exposed through a first part of the housing, a microphone disposed in the interior of the housing and exposed through a second part of the housing, at least one speaker disposed in the interior of the housing and exposed through a third part of the housing, a wireless communication circuit disposed in the interior of the housing, a memory disposed in the interior of the housing, wherein the memory is configured to store an application program including a user interface for displaying one or a plurality of items and a processor disposed in the interior of the housing and electrically connected to the display, the microphone, the at least one speaker, the wireless communication circuit, and the memory.

According to an embodiment, the processor may be configured to display a user interface including the one or the plurality of items on the display, receive a first user utterance through the microphone while the user interface is displayed, wherein the first user utterance includes a first request for executing a first task by using at least one item that, among the one or the plurality of items, is specified by the first user utterance, transmit first data related to the first user utterance to an external server through the wireless communication circuit, receive a first response from the external server through the wireless communication circuit, wherein the first response includes information on a first sequence of states of the electronic device for executing the first task and the first response further includes numbers and locations of the one or the plurality of items in the user interface, and execute the first task including an operation of allowing the application program to select the one or the plurality of items based on the numbers or the locations.

According to various embodiments, the operation efficiency or operation reliability of a speech recognition service may be improved by processing anaphora or ordinals included in the utterance of the user.

In addition, the present disclosure may provide various effects that are directly or indirectly recognized.

Other aspects, advantages, and salient features of the disclosure will become apparent to those skilled in the art from the following detailed description, which, taken in conjunction with the annexed drawings, discloses various embodiments of the present disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1A:
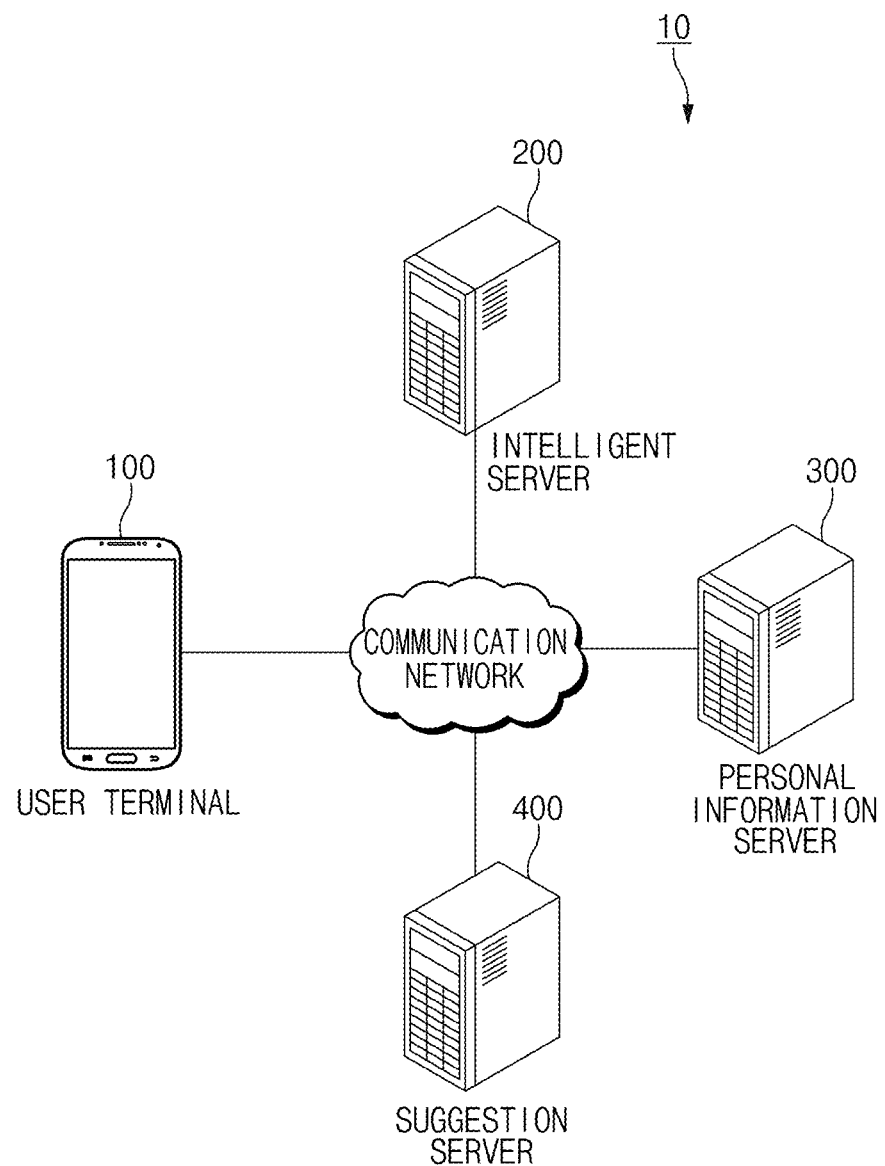
FIG. 1A illustrates a view of an integrated intelligent system according to an embodiment.

FIGS. 1A through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, various embodiments of the present disclosure are disclosed with reference to the accompanying drawings. However, the present disclosure is not intended to be limited by the various embodiments of the present disclosure to a specific embodiment and it is intended that the present disclosure covers all modifications, equivalents, and/or alternatives of the present disclosure provided they come within the scope of the appended claims and their equivalents. With respect to the descriptions of the accompanying drawings, like reference numerals refer to like elements.

The terms and words used in the following description and claims are not limited to their dictionary definitions, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The term "include," "comprise," and "have", or "may include," or "may comprise" and "may have" used herein indicates disclosed functions, operations, or existence of elements but does not exclude other functions, operations or elements.

For example, the expressions "A or B," or "at least one of A and/or B" may indicate A and B, A, or B. For instance, the expression "A or B" or "at least one of A and/or B" may indicate (1) at least one A, (2) at least one B, or (3) both at least one A and at least one B.

The terms such as "1st," "2nd," "first," "second," and the like used herein may refer to modifying various different elements of various embodiments of the present disclosure, but are not intended to limit the elements. For instance, "a first user device" and "a second user device" may indicate different users regardless of order or importance. For example, a first component may be referred to as a second component and vice versa without departing from the scope and spirit of the present disclosure.

In various embodiments of the present disclosure, it is intended that when a component (for example, a first component) is referred to as being "operatively or communicatively coupled with/to" or "connected to" another component (for example, a second component), the component may be directly connected to the other component or connected through another component (for example, a third component). In various embodiments of the present disclosure, it is intended that when a component (for example, a first component) is referred to as being "directly connected to" or "directly accessed" another component (for example, a second component), another component (for example, a third component) does not exist between the component (for example, the first component) and the other component (for example, the second component).

The expression "configured to" used in various embodiments of the present disclosure may be interchangeably used with "suitable for," "having the capacity to," "designed to,"

"adapted to," "made to," or "capable of" according to the situation, for example. The term "configured to" may not necessarily indicate "specifically designed to" in terms of hardware. Instead, the expression "a device configured to" in some situations may indicate that the device and another device or part are "capable of." For example, the expression "a processor configured to perform A, B, and C" may indicate a dedicated processor (for example, an embedded processor) for performing a corresponding operation or a general purpose processor (for example, a central processing unit (CPU) or application processor (AP)) for performing corresponding operations by executing at least one software program stored in a memory device.

Terms used in various embodiments of the present disclosure are used to describe certain embodiments of the present disclosure, but are not intended to limit the scope of other embodiments. The terms of a singular form may include plural forms unless they have a clearly different meaning in the context. Otherwise, all terms used herein may have the same meanings that are generally understood by a person skilled in the art. In general, terms defined in a dictionary should be considered to have the same meanings as the contextual meaning of the related art, and, unless clearly defined herein, should not be understood differently or as having an excessively formal meaning. In any case, even the terms defined in the present specification are not intended to be interpreted as excluding embodiments of the present disclosure.

An electronic device according to various embodiments of the present disclosure may include at least one of a smartphone, a tablet personal computer (PC), a mobile phone, a video telephone, an electronic book reader, a desktop PC, a laptop PC, a netbook computer, a workstation, a server, a personal digital assistant (PDA), a portable multimedia player (PMP), a Motion Picture Experts Group (MPEG-1 or MPEG-2) Audio Layer 3 (MP3) player, a mobile medical device, a camera, or a wearable device. The wearable device may include at least one of an accessory-type device (e.g., a watch, a ring, a bracelet, an anklet, a necklace, glasses, a contact lens, a head-mounted device (HMD)), a textile- or clothing-integrated-type device (e.g., an electronic apparel), a body-attached-type device (e.g., a skin pad or a tattoo), or a bio-implantable-type device (e.g., an implantable circuit)

In some various embodiments of the present disclosure, an electronic device may be a home appliance. The smart home appliance may include at least one of, for example, a television (TV), a digital video/versatile disc (DVD) player, an audio, a refrigerator, an air conditioner, a cleaner, an oven, a microwave oven, a washing machine, an air cleaner, a set-top box, a home automation control panel, a security control panel, a television (TV) box (e.g., Samsung Home-Sync™, Apple TV™, or Google TV™), a game console (e.g., Xbox™ or PlayStation™) an electronic dictionary, an electronic key, a camcorder, or an electronic picture frame In other various embodiments of the present disclosure, an electronic device may include at least one of various medical devices (e.g., various portable medical measurement devices (e.g., a blood glucose measuring device, a heart rate measuring device, a blood pressure measuring device, a body temperature measuring device, or the like), a magnetic resonance angiography (MRA), a magnetic resonance imaging (MRI), a computed tomography (CT), a scanner, an ultrasonic device, or the like), a navigation device, a global navigation satellite system (GNSS), an event data recorder (EDR), a flight data recorder (FDR), a vehicle infotainment device, electronic equipment for vessels (e.g., a navigation system, a gyrocompass, or the like), avionics, a security device, a head unit for a vehicle, an industrial or home robot, an automatic teller machine (ATM), a point of sales (POS) device of a store, or an Internet of things (IoT) device (e.g., a light bulb, various sensors, an electric or gas meter, a sprinkler, a fire alarm, a thermostat, a streetlamp, a toaster, exercise equipment, a hot water tank, a heater, a boiler, or the like).

According to various embodiments of the present disclosure, an electronic device may include at least one of a part of furniture or a building/structure, an electronic board, an electronic signature receiving device, a projector, or a measuring instrument (e.g., a water meter, an electricity meter, a gas meter, a wave meter, or the like). An electronic device may be one or more combinations of the above-mentioned devices. An electronic device according to some various embodiments of the present disclosure may be a flexible device. An electronic device according to an embodiment of the present disclosure is not limited to the above-mentioned devices, and may include new electronic devices with the development of new technology.

Hereinafter, an electronic device according to various embodiments of the present disclosure will be described in more detail with reference to the accompanying drawings. The term "user" used herein may refer to a person who uses an electronic device or may refer to a device (e.g., an artificial intelligence electronic device) that uses an electronic device.

Prior to describing various embodiments of the present disclosure, an integrated intelligent system to which various embodiments of the present disclosure is capable of being applied will be described with reference to FIGS. 1A to 1E.

FIG. 1A illustrates a view of an integrated intelligent system according to an embodiment.

Referring to FIG. 1A, an integrated intelligent system 10 may include a user terminal 100, an intelligence server 200, a personal information server 300, or a proposal server 400.

The user terminal 100 may provide a service used for a user through an app (or an application program) (e.g., an alarm app, a message app, a picture (gallery) app, or the like) stored in the user terminal 100. For example, the user terminal 100 may execute and operate other app through an intelligence app (or a speech recognition app) stored in the user terminal 100. A user input for launching and operating the other app through the intelligence app of the user terminal 100 may be received. For example, the user input may be received through a physical button, a touch pad, a voice input, a remote input, or the like. According to an embodiment, various types of terminal devices (or an electronic device), which are connected with Internet, such as a mobile phone, a smartphone, personal digital assistant (PDA), a notebook computer, and the like may be the user terminal 100. According to an embodiment, the user terminal 100 may receive user utterance as a user input. The user terminal 100 may receive the user utterance and may generate an instruction for operating an app based on the user utterance. As such, the user terminal 100 may operate the app by using the instruction.

The intelligence server 200 may receive a voice input of a user from the user terminal 100 over a communication network and may change the voice input to text data. In another embodiment, the intelligence server 200 may generate (or select) a path rule based on the text data. The path rule may include information about an action (or an operation) for performing the function of an app or information about a parameter used to perform the action. In addition, the path rule may include the sequence of actions of the app (or the sequence of states).

The user terminal 100 may receive the path rule, may select an app depending on the path rule, and may execute an action included in the path rule in the selected app. For example, the user terminal 100 may execute the action and may display a screen corresponding to a state of the user terminal 100, which executes the action, in a display. For another example, the user terminal 100 may execute the action and may not display the result obtained by executing the action in the display. For example, the user terminal 100 may execute a plurality of actions and may display only the result of a part of the plurality of actions in the display. For example, the user terminal 100 may display only the result, which is obtained by executing the last action among a plurality of actions, in the display. For another example, the user terminal 100 may display the result obtained by executing the action in the display, in response to the user input.

A personal information server 300 may include user information or a database in which information about a user terminal 100 is stored. For example, the personal information server 300 may receive the user information (e.g., context information, name information, age information, gender information, address information, occupation information, health information, financial information, user preference information or the like) from the user terminal 100 to store the user information in the database. Alternatively, the personal information server 300 may receive usage information (e.g., app installation information, app execution information, call information, battery information, location information, or communication information) of the user terminal 100 from the user terminal 100 to store the usage information in the database. In an embodiment, in the case where the personal information server 300 verifies information received from the user terminal 100 or information pre-stored in the database, the personal information server 300 may update the database.

An intelligence server 200 may be used to receive the user information or information of the user terminal 100 from the personal information server 300 over the communication network and to generate a path rule associated with the user input. According to an embodiment, the user terminal 100 may receive the user information from the personal information server 300 over the communication network, and may use the user information as information for managing the database.

The proposal server 400 may include a database storing information about a function in a terminal, introduction of an application, or a function to be provided. For example, the proposal server 400 may include a database associated with a function that a user utilizes by receiving the user information of the user terminal 100 from the personal information server 300. The user terminal 100 may receive information about the function to be provided from the proposal server 400 over the communication network and may provide the received information to the user.

Figure 1B:
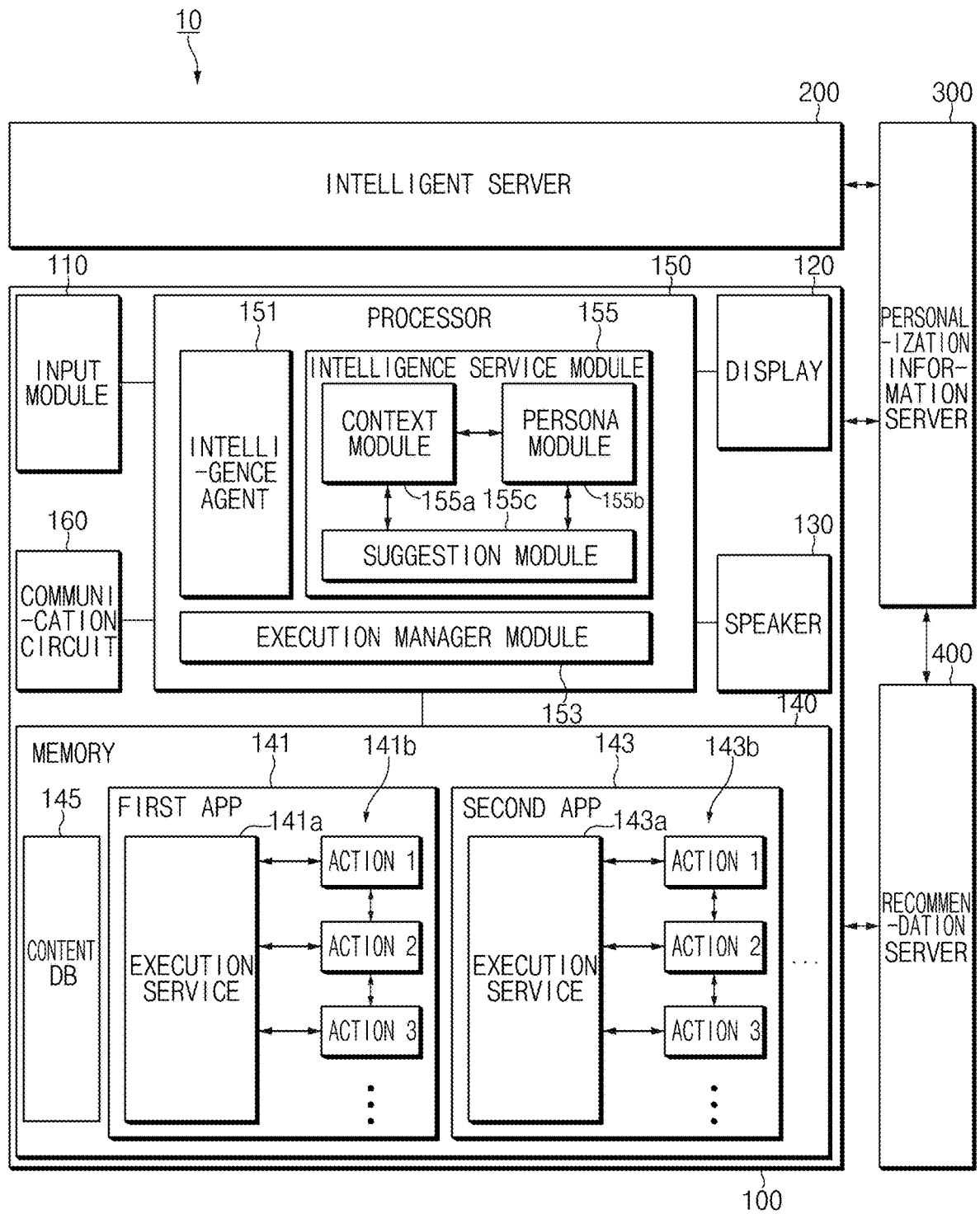
FIG. 1B illustrates a view of a user terminal of an integrated intelligent system according to an embodiment.

FIG. 1B illustrates a view of a user terminal of an integrated intelligent system according to an embodiment.

Referring to FIG. 1B, the user terminal 100 may include an input module 110, a display 120, a speaker 130, a memory 140, a processor 150, or a communication circuit 160. At least some configurations (e.g., the input module 110, the display 120, the speaker 130, the memory 140, or the communication circuit 160) of the user terminal 100 may be electrically connected to the processor 150. The user terminal 100 may further include a housing, and the configurations of the user terminal 100 may be seated in the interior of the housing or may be located on the housing. In various embodiments, the user terminal 100 may be named an electronic device, and may further include elements of the electronic device 901, which will be mentioned through FIG. 9.

According to an embodiment, the input module 110 may receive a user input from the user. For example, the input module 110 may receive a user input from an external device (e.g., a keyboard or a headset) connected thereto. As another example, the input module 110 may include a touchscreen (e.g., a touchscreen display) coupled to the display 120. As another example, the input module 110 may include a hardware key (or a physical key or a capacitive button) located in the user terminal 100 (or the housing of the user terminal 100). According to an embodiment, the input module 110 may include a microphone (e.g., 111 of FIG. 1C) that may receive an utterance of the user as a speech signal. For example, the input module 110 includes an utterance (speech) input system, and may receive an utterance of the user as a speech signal through the utterance input system. In an embodiment, at least a portion of the microphone 111 may be exposed through an area of the housing to receive an input according to an utterance of the user, and the microphone 111 may be controlled to be on or may be driven when a user manipulation is applied to a hardware key (e.g., 112 of FIG. 1C) provided to an area of the user terminal 100. The user manipulation may include a press manipulation or a press and hold manipulation for the hardware key 112. According to an embodiment, the display 120 may display an image, a video, and/or an execution screen of an application. For example, the display 120 may display a graphical user interface (GUI) of an app. In an embodiment, at least a portion of the display 120 may be exposed through an area (e.g., an area that is different from an area through which at least a portion of the microphone 111 is exposed) to receive a touch input by the body (e.g., a finger) of the user. In this regard, the display 120 may be understood as a touchscreen display including a cover glass and/or a touch panel (or a touch sensor).

According to an embodiment, the speaker 130 may output a speech signal. For example, at least a portion of the speaker 130 may be exposed through an area (e.g., an area that is different from an area through which at least a portion of the microphone 111 or the display 120 is exposed) of the housing to output a speech signal generated in the interior of the user terminal 100 or received from an external device (e.g., an intelligent server 200 (see FIG. 1A)).

According to an embodiment, the memory 140 may store a plurality of apps 141 and 143. The plurality of apps 141 and 143 stored in the memory 140 may be selected, executed, and operated according to a user input. According to an embodiment, the memory 140 may include a database that may store information that is used for recognizing a user input. For example, the memory 140 may include a log database that may store log information. As another example, the memory 140 may include a persona database that may store user information. Alternatively, the memory 140 may include a content database 145 that stores information on one or more contents (e.g., an image, a video, or a document) related to an operation of the plurality of apps 141 and 143. In an embodiment, the content database 145 may contain identification information of contents (e.g., an attribute of contents), related additional information, or index information (e.g., an arrangement or display sequential information on a plurality of contents related to a specific app).

According to an embodiment, the memory 140 may store a plurality of apps 141 and 143, and the plurality of apps 141 and 143 may be loaded and operated. For example, the plurality of apps 141 and 143 stored in the memory 140 may be loaded and operated by an execution manager module 153 of the processor 150. The plurality of apps 141 and 143 may include an execution service 141a and 143a that performs a function or a plurality of operations (or unit operations) 141b and 143b. The execution service 141a and 143a may be generated by the execution manager module 153 of the processor 150, and may execute a plurality of operations 141b and 143b.

According to an embodiment, when the operations 141b and 143b of the apps 141 and 143 are executed, an execution state screen according to the execution of the operations 141b and 143b may be displayed on the display 120. The execution state screen, for example, may be a screen on which the operations 141b and 143b are performed. As another example, the execution state screen may be a screen of a state (partial landing) (e.g., a case in which a parameter that is used for the operations 141b and 143b is not input) in which the execution of the operations 141b and 143b is stopped.

According to an embodiment, the execution services 141a and 143a may execute the operations 141b and 143b according to a path rule. For example, the execution services 141a and 143a may be activated by the execution manager module 153, may receive a request for execution from the execution manager module 153 according to the path rule, and may execute operations 141b and 143b of the app 141 and 143 according to the request for execution. If the operations 141b and 143b are performed, the execution services 141a and 143ab may transmit the completion information to the execution manager module 153.

According to an embodiment, when the apps 141 and 143 execute a plurality of operations 141b and 143b, the plurality of operations 141b and 143b may be sequentially executed. If one operation (e.g., operation 1) is executed, the execution services 141a and 143ab may open the following operation (e.g., operation 2) and transmit the completion information to the execution manager module 153. Here, opening an arbitrary operation may be understood as transitting an arbitrary operation to an executable state or preparing for execution of an arbitrary operation. In other words, if an arbitrary operation is not opened, the corresponding operation cannot be executed. If receiving the completion information, the execution manager module 153 may transmit a request to execution of the following operation (e.g., operation 2) to the execution services 141a and 143a. According to an embodiment, when the plurality of apps 141 and 143 are executed, the plurality of apps 141 and 143 may be sequentially executed. For example, if receiving completion information after the final operation of the first app 141 is executed, the execution manager module 153 may transmit a request for execution of the first operation of the second app 143 to the execution service 143a.

According to an embodiment, when the plurality of operations 141b and 143b are executed by the apps 141 and 143, result screens according to the executions of the plurality of executed operations 141b and 143b may be displayed on the display 120. According to an embodiment, only a part of the plurality of result screens according to the executions of the plurality of operations 141b and 143b may be displayed on the display 120.

According to an embodiment, the memory 140 may store an intelligent app (e.g., a speech recognition app) that interworks with the intelligent agent 151. The app that interworks with the intelligent agent 151 may receive an utterance of the user as a speech signal and may process the speech signal. According to an embodiment, the app that interworks with the intelligent agent 151 may be operated by a specific input (e.g., an input through a hardware key, an input through a touchscreen, or a specific speech input) input through the input module 110.

According to an embodiment, the processor 150 may control an overall operation of the user terminal 100. For example, the processor 150 may receive a user input by controlling the input module 110. The processor 150 may display an image by controlling the display 120. The processor 150 may output a speech signal by controlling the speaker 130. The processor 150 may fetch or store information by controlling the memory 140.

According to an embodiment, the processor 150 may include an intelligent agent 151, an execution manager module 153, or an intelligent service module 155. According to an embodiment, the processor 150 may drive the intelligent agent 151, the execution manager module 153, or the intelligent service module 155 by executing instructions stored in the memory 140. Several modules mentioned in various embodiments of the present disclosure may be realized by hardware or may be realized by software. In various embodiments of the present disclosure, an operation performed by the intelligent agent 151, the execution manager module 153, or the intelligent service module 155 may be understood as an operation performed by the processor 150.

According to an embodiment, the intelligent agent 151 may generate a command for operating the app based on a speech signal received as a user input. According to an embodiment, the execution manager module 153 may receive the generated command from the intelligent agent 151 and may select, execute, and operate the apps 141 and 143 stored in the memory 140. According to an embodiment, the intelligent service module 155 may manage information of the user and use the information in processing the user input.

The intelligent agent 151 may transmit the user input received through the input module 110 to the intelligent server 200 and process the transmitted user input.

According to an embodiment, the intelligent agent 151 may preprocess the user input before the user input is transmitted to the intelligent server 200. According to an embodiment, the intelligent agent 151 may include an adaptive echo canceller (AEC) module, a noise suppression (NS) module, an end-point detection (EPD) module, or an automatic gain control (AGC) module to preprocess the user input. The adaptive echo canceller module may cancel an echo included in the user input. The noise suppression module may suppress background noise included in the user input. The end-point detection module may discover a part in which a speech of the user is present by detecting an end point of a speech of the user included in the user input. The automatic gain control module may recognize the user input and adjust a volume of the user input such that the user input may be suitably processed. Although the intelligent agent 151 may include all of the preprocessing configurations for performance according to an embodiment, the intelligent agent 151 may include some of the preprocessing configurations to be operated at a low power.

According to an embodiment, the intelligent agent 151 may include a wakeup recognition module that recognizes a call of the user. The wakeup recognition module may recognize a wakeup command of the user through the speech recognition module, and when receiving the wakeup command, may activate the intelligent agent 151 to receive a user input. According to an embodiment, the wakeup recognition module of the intelligent agent 151 may be realized in a low-power processor (e.g., a processor included in an audio codec). According to an embodiment, the intelligent agent 151 may be activated according to a user input through a hardware key. When the intelligent agent 151 is activated, an intelligent app (e.g., a speech recognition app) that interworks with the intelligent agent 151 may be executed.

According to an embodiment, the intelligent agent 151 may include a speech recognition module for executing a user input. The speech recognition module may recognize a user input for allowing an app to execute an operation. For example, the speech recognition module may recognize a restricted user (speech) input (e.g., an utterance, such as a click, which executes a photographing operation when a camera app is being executed) for allowing the apps 141 and 143 to execute an operation, such as the wakeup command. The speech recognition module that assists the intelligent server 200 and recognizes a user input, for example, may recognize and rapidly process a user command that may be processed in the user terminal 100. According to an embodiment, the speech recognition module for executing the user input of the intelligent agent 151 may be realized in an app processor.

According to an embodiment, the speech recognition module (including the speech recognition module of the wakeup module) of the intelligent agent 151 may recognize a user input by using an algorithm for recognizing a speech. The algorithm used for recognizing the speech, for example, may be at least one of a hidden Markov model (HMM) algorithm, an artificial neural network (ANN) algorithm, or a dynamic time warping (DTW) algorithm.

According to an embodiment, the intelligent agent 151 may convert a speech input of the user to text data. According to an embodiment, the intelligent agent 151 may deliver the speech of the user to the intelligent server 200 and receive the converted text data. Accordingly, the intelligent agent 151 may display the text data on the display 120.

According to an embodiment, the intelligent agent 151 may receive a path rule transmitted from the intelligent server 200. According to an embodiment, the intelligent agent 151 may transmit the path rule to the execution manager module 153.

According to an embodiment, the intelligent agent 151 may transmit an execution result log according to the path rule received from the intelligent server 200 to the intelligent service module 155, and the received execution result log may be accumulated in preference information of the user of a persona module (persona manager) 155b to be managed.

According to an embodiment, the execution manager module 153 may receive a path rule from the intelligent agent 151 to execute the apps 141 and 143, and may allow the apps 141 and 143 to execute operations 141b and 143b included in the path rule. For example, the execution manager module 153 may transmit command information for executing the operations 141b and 143b to the apps 141 and 143, and may receive completion information of the operations 141b and 143b from the apps 141 and 143.

According to an embodiment, the execution manager module 153 may transmit and receive command information for executing the operations 141b and 143b of the apps 141 and 143 between the intelligent agent 151 and the apps 141 and 143. The execution manager module 153 may bind the apps 141 and 143 that will be executed according to the path rule, and may transmit the command information of the operations 141b and 143b included in the path rule to the apps 141 and 143. For example, the execution manager module 153 may sequentially transmit the operations 141b and 143b included in the path rule to the apps 141 and 143, and may sequentially execute the operations 141b and 143b of the apps 141 and 143 according to the path rule.

According to an embodiment, the execution manager module 153 may manage the execution states of the operations 141b and 143b of the apps 141 and 143. For example, the execution manager module 153 may receive information on the execution states of the operations 141b and 143b from the apps 141 and 143. When the execution states of the operations 141b and 143b, for example, is in a stop state (partial landing) (e.g., when a parameter that is used for the operations 141b and 143b is not input), the execution manager module 153 may transmit the information on the stop state to the intelligent agent 151. The intelligent agent 151 may request an input of information (e.g., parameter information) for the user, by using the received information. When the execution states of the operations 141b and 143b, as another example, is in an operation state, an utterance may be received from the user, and the execution manager module 153 may transmit the apps 141 and 143 that is being executed and the information on the execution states of the apps 141 and 143 to the intelligent agent 151. The intelligent agent 151 may receive parameter information of the utterance of the user through the intelligent server 200, and may transmit the received parameter information to the execution manager module 153. The execution manager module 153 may change the parameters of the operation 141b and 143b to new parameters by using the received parameter information.

According to an embodiment, the execution manager module 153 may deliver the parameter information included in the path rule to the apps 141 and 143. When the plurality of apps 141 and 143 are sequentially executed according to the path rule, the execution manager module 153 may deliver the parameter information included in the path rule from one app to another app.

According to an embodiment, the execution manager module 153 may receive a plurality of path rules. The execution manager module 153 may select a plurality of path rules based on an utterance of the user. For example, when the utterance of the user specifies some apps 141 that will execute some operations 141a but does not specify another app 143 that will execute the remaining operations 143b, the execution manage module 153 may receive a plurality of different path rules in which the apps 141 (e.g., a gallery app) that will execute some operations 141a are executed and different apps 143 (e.g., a message app and a telegram app) that may execute the remaining operations 143b are executed. The execution manager module 153, for example, may execute the same operation 141b and 143b (e.g., the continuous same operations 141b and 143b) of the plurality of path rules. When executing the same operation, the execution manager module 153 may display a state screen from which different apps 141 and 143 included in the plurality of path rules are selected, respectively, on the display 120.

According to an embodiment, the intelligent service module 155 may include a context module 155a, a persona module 155b, or a suggestion module 155c.

The context module 155a may collect the current states of the apps 141 and 143 from the apps 141 and 143. For example, the context module 155a may receive context information that represents the current states of the apps 141 and 143 and collect the current states of the apps 141 and 143.

The persona module 155*b* may manage private information of the user who uses the user terminal 100. For example, the persona module 155*b* may collect user information and a performance result of the user terminal 100 and manage private information of the user.

The suggestion module 155*c* may predict an intention of the user and recommend a command to the user. For example, the suggestion module 155*c* may recommend a command to the user in consideration of the current state (e.g., a time, a site, a situation, or an app) of the user.

According to an embodiment, the communication circuit 160 (or the communication module) may establish wired communication or wireless communication according to a specified protocol with at least one external device (e.g., the intelligent server 200, the private information server 300, or the suggestion server 400) of the integrated intelligent system 10. The communication circuit 160 may transmit and receive at least one piece of information related to an operation of the speech recognition service based on the wired communication or wireless communication.

Figure 1C:
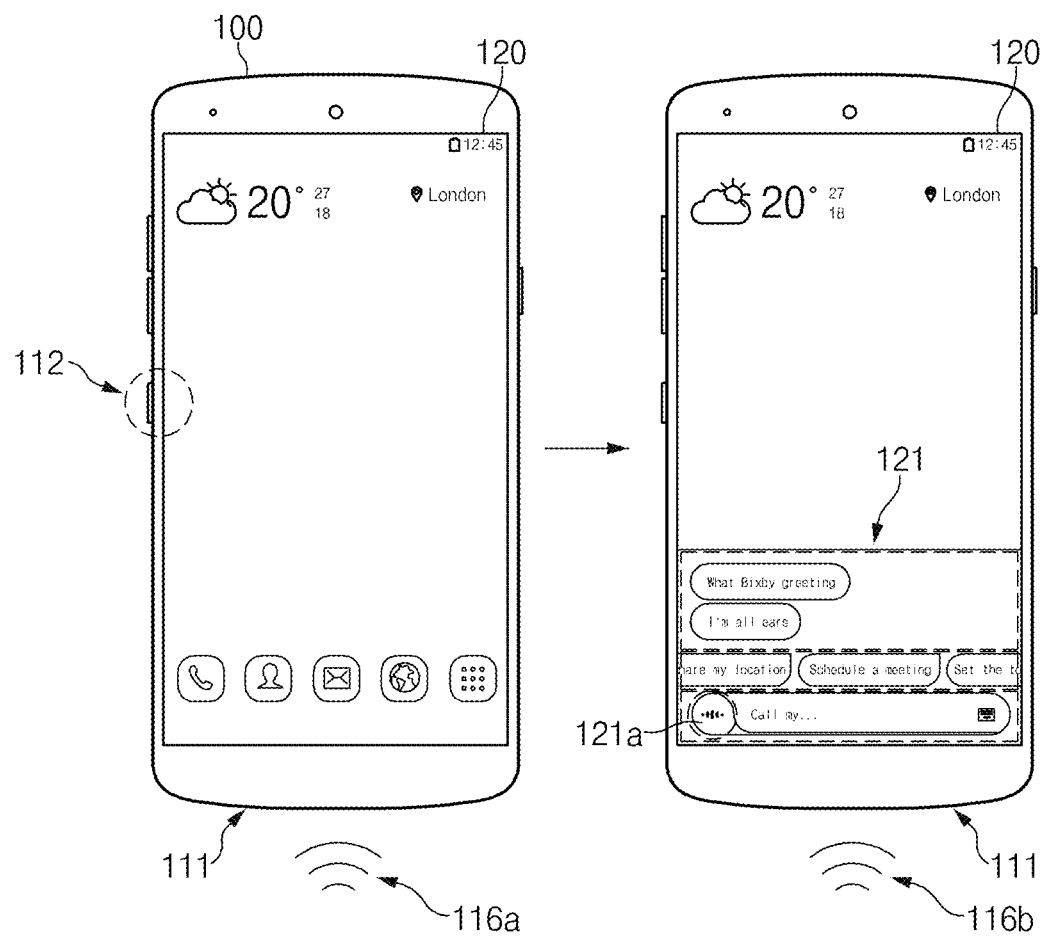
FIG. 1C illustrates a view of an execution form of an intelligent app according to an embodiment.

FIG. 1C illustrates a view of an execution form of an intelligent app according to an embodiment.

Referring to FIG. 1C, the user terminal 100 may receive a user input and may execute an intelligent app (e.g., a speech recognition app) that interworks with the intelligent agent 151.

According to an embodiment, the user terminal 100 may execute an intelligent app for recognizing a speech through the hardware key 112. For example, when receiving a user input through the hardware key 112, the user terminal 100 may display a user interface (UI) 121 of the intelligent app on the display 120. The user, for example, may touch the speech recognition button 121*a* to input (116*b*) a speech while the UI 121 of the intelligent app is displayed on the display 120. The user, as another example, may input (116*b*) a speech by pressing the hardware key 112.

According to an embodiment, the user terminal 100 may execute an intelligent app for recognizing a speech through the microphone 111. For example, when a specific speech (e.g., Wake up!) is input (116*a*) through the microphone 111, the user terminal 100 may display the UI 121 of the intelligent app on the display 120.

Figure 1D:
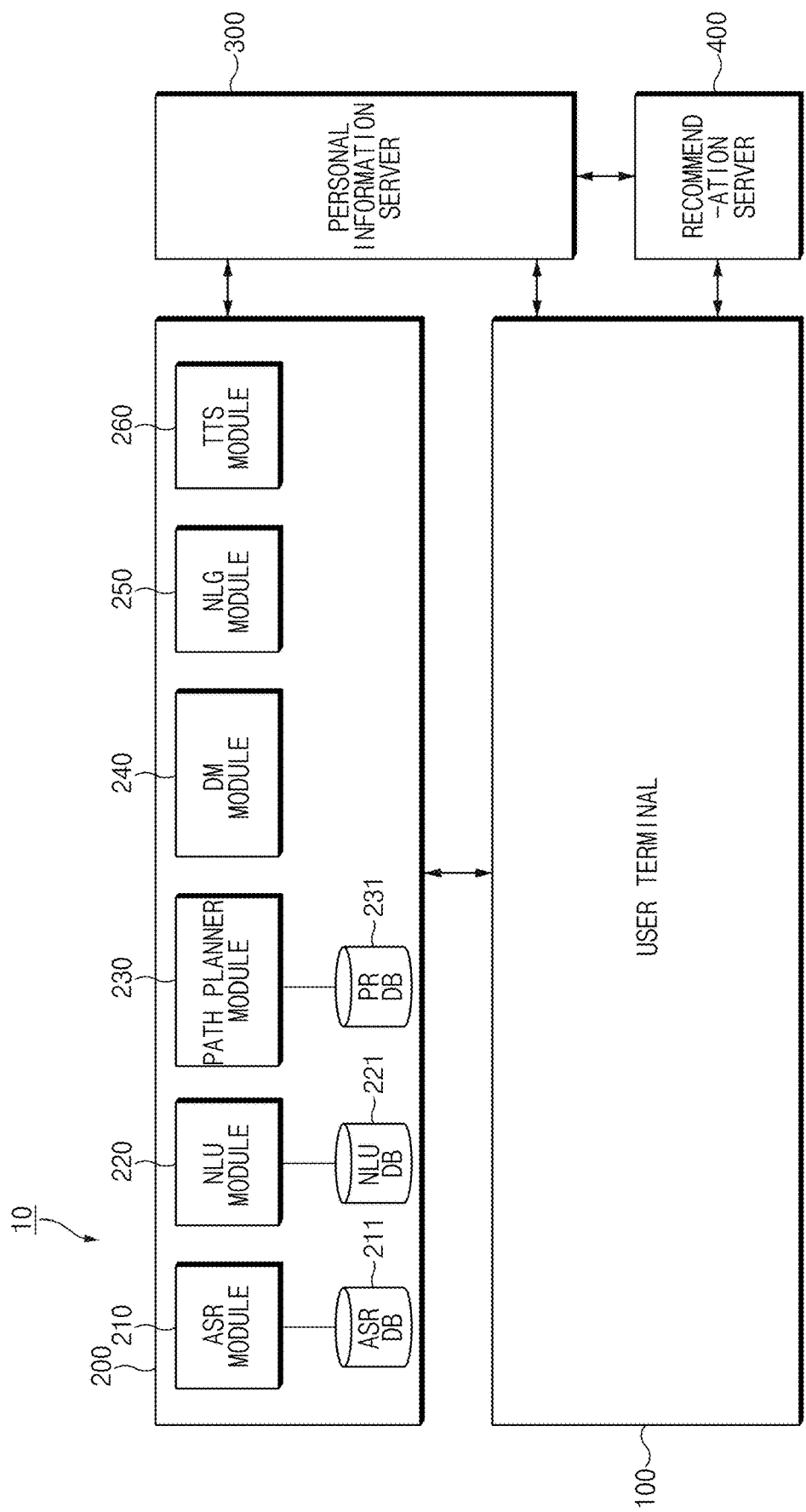
FIG. 1D illustrates a view of an intelligent server of an integrated intelligent system according to an embodiment.

FIG. 1D illustrates a view of an intelligent server of an integrated intelligent system according to an embodiment.

Referring to FIG. 1D, the intelligent server 200 may include an automatic speech recognition (ASR) module 210, a natural language understanding (NLU) module 220, a path planner module 230, a dialogue manager (DM) module 240, a natural language generator (NLG) module 250, or a text-to-speech (TTS) module 260. In various embodiments, the above-mentioned elements 210, 220, 230, 240, 250, or 260 of the intelligent server 200 may be realized individually or at least some elements thereof may be integrated. According to an embodiment, the intelligent server 200 may include a controller (or a processor) that controls the functional operations of the elements 210, 220, 230, 240, 250, or 260 as a whole, a storage device (or a memory) coupled to the controller, or a communication interface (or a communication circuit) that supports access to a communication network.

The natural language understanding module 220 or the path planner module 230 of the intelligent server 200 may generate a path rule.

According to an embodiment, the automatic speech recognition module 210 may convert the user input received from the user terminal 100 to text data. For example, the automatic speech recognition module 210 may include an utterance recognition module. The utterance recognition module may include an acoustic model and a language mode. For example, the acoustic model may include information related to phonation, and the language model may include unit phoneme information and information on a combination of unit phoneme information. The utterance recognition module may convert an utterance of the user to text data by using information related to phonation and information on unit phoneme information. The information on the acoustic model and the language model, for example, may be stored in an automatic speech recognition database (ASRDB).

According to an embodiment, the natural language understanding module 220 may recognize an intention of the user by performing a syntactic analysis or a semantic analysis. The syntactic analysis may divide a user input into a semantic unit (e.g., a wording, a phase, or a morpheme), and may recognize which syntactic elements the divided units have. The semantic analysis may be performed by semantic matching, rule matching, or formula matching. Accordingly, the natural language understanding module 220 may obtain a domain, an intention, or a parameter (or slot) that is used for expressing the intention.

According to an embodiment, the natural language understanding module 220 may determine the intention of the user and the parameter by using a matching rule that is divided into the domain, the intention, and the parameter (or slot) that is used for recognizing the intention. For example, the one domain (e.g., an alarm) may include a plurality of intentions (e.g., setting of an alarm or release of an alarm), and the one intention may include a plurality of parameters (e.g., a time, the number of repetitions, or an alarm sound). The plurality of rules, for example, may include one or more element parameters. The matching rule may be stored in a natural language understanding database 221 (NLU DB).

According to an embodiment, the natural language understanding module 220 may recognize a meaning of a wording extracted from a user input by using linguistic features (e.g., syntactic elements), such as a morpheme or a phrase, and may determine an intention of the user by matching the recognized meaning of the wording with the domain and the intention. For example, the natural language understanding module 220 may determine the intention of the user by calculating how many wordings extracted from the user input are included in the domain and the intention. According to another embodiment, the natural language understanding module 220 may determine a parameter of the user input by using a wording that is a base for recognizing the intention. According to an embodiment, the natural language understanding module 220 may determine an intention of the user by using a natural language recognition database 221 in which a linguistic feature for recognizing an intention of a user input is stored. According to an embodiment, the natural language understanding module 220 may determine the intention of the user by using a personal language model (PLM). For example, the natural language understanding module 220 may determine the intention of the user by using private information (e.g., a contact address list or a music list). The personal language model, for example, may be stored in the natural language recognition database 221. According to an embodiment, the automatic speech recognition module 210 as well as the natural language understanding module 220 may recognize a speech of the user with reference to the personal language model stored in the natural language recognition database 221.

According to an embodiment, the natural language understanding module 220 may generate a path rule based on an intention of the user and a parameter. For example, the natural language understanding module 220 may select an app that will be executed based on an intention of the user input and may determine an operation that will be performed by the selected app. The natural language understanding module 220 may generate a path rule by determining a parameter corresponding to the determined operation. According to an embodiment, the path rule generated by the natural language understanding module 220 may include an app that will be executed, an operation that will be executed by the app, and a parameter that is used for executing the operation.

According to an embodiment, the natural language understanding module 220 may generate one path rule or a plurality of path rules based on an intention of the user and a parameter. For example, the natural language understanding module 220 may receive a path rule set corresponding to the user terminal 100 from the path planner module 230 and may determine a path rule by mapping the intention of the user input and the parameter with the path rule set received.

According to another embodiment, the natural language understanding module 220 may generate one path rule or a plurality of path rules by determining an app that will be executed, an operation that will be executed by the app, and a parameter that is used for executing the operation based on the intention of the user input and the parameter. For example, the natural language understanding module 220 may generate a path rule by arranging the app that will be executed and the operation that will be executed by the app in the form of an ontology or a graph model by using information of the user terminal 100. The generated path rule, for example, may be stored in a path rule database 231 (PR DB) through the path planner module 230. The generated path rule may be added to the path rule set of the database 231.

According to an embodiment, the natural language understanding module 220 may select at least one of the plurality of path rules generated. For example, the natural language understanding module 220 may select an optimum path rule from the plurality of path rules. As another example, the natural language understanding module 220 may select a plurality of path rules when only some operations are specified based on the utterance of the user. The natural language understanding module 220 may determine one of the plurality of path rules through an additional input of the user.

According to an embodiment, the natural language understanding module 220 may transmit a path rule to the user terminal 100 as a request for a user input. For example, the natural language understanding module 220 may transmit one path rule corresponding to a user input to the user terminal 100. As another example, the natural language understanding module 220 may transmit a plurality of path rules corresponding to a user input to the user terminal 100. The plurality of path rules, for example, may be generated by the natural language understanding module 220 when only some operations are specified based on the utterance of the user.

According to an embodiment, the path planner module 230 may select at least one of the plurality of path rules.

According to an embodiment, the path planner module 230 may deliver a path rule set including a plurality of path rules to the natural language understanding module 220. The plurality of path rules of the path rule set may be stored in the database 231 connected to the path planner module 230 in the form of a table. For example, the path planner module 230 may deliver a path rule set corresponding to information (e.g., OS information or app information) of the user terminal 100 received from the intelligent agent 151 to the natural language understanding module 220. The table stored in the path rule database 231, for example, may be stored in a domain or for versions of domains.

According to an embodiment, the path planner module 230 may select one path rule or a plurality of path rules from the path rule set and may deliver the selected path rule or path rules to the natural language understanding module 220. For example, the path planner module 230 may select one path rule or a plurality of path rules by matching the intention of the user and the parameter with the path rule set corresponding to the user terminal 100, and may deliver the selected path rule or path rules to the natural language understanding module 220.

According to an embodiment, the path planner module 230 may generate one path rule or a plurality of path rules by using an intention of the user input and a parameter. For example, the path planner module 230 may generate one path rule or a plurality of path rules by determining an app that will be executed and an operation that will be executed by the app, based on the intention of the user and the parameter. According to an embodiment, the path planner module 230 may store the generated path rule or path rules in the path rule database 231.

According to an embodiment, the path planner module 230 may store the path rule or path rules generated by the natural language understanding module 220 in the path rule database 231. The generated path rule or path rules may be added to the path rule set stored in the database 231.

According to an embodiment, the table stored in the path rule database 231 may include a plurality of path rules or a plurality of path rule sets. The plurality of path rules or the plurality of path rule sets may reflect the kind, the version, the type, or the features of the device that performs the path rules.

According to an embodiment, the dialogue manager module 240 may determine whether the intention of the user recognized by the natural language understanding module 220 may be explicit. For example, the dialogue manager module 240 may determine whether the intention of the user is explicit based on whether the information of the parameter is sufficient. The dialogue manager module 240 may determine whether the parameter recognized in the natural language understanding module 220 is suitable for performing a task. According to an embodiment, the dialogue manager module 240 may perform a feedback that requests information for the user when the intention of the user is not explicit. For example, the dialogue manager module 240 may perform a feedback that requests information on the parameter for recognizing the intention of the user.

According to an embodiment, the dialogue manager module 240 may include a content provider module. When being able to perform an operation based on the intention recognized by the natural language understanding module 220 and the parameter, the content provider module may generate a result obtained by performing the task corresponding to the user input. According to an embodiment, the dialogue manager module 240 may transmit the result generated by the content provider module to the user terminal 100 in response to the user input.

According to an embodiment, the natural language generating (NLG) module 250 may change specific information into the form of a text. The information changed into the form of a text may be a form of an utterance of a natural language. The specific information, for example, may be information on an additional input, information that guides completion of the operation corresponding to the user input, or information (e.g., feedback information on the user input) that guides the additional input of the user. The information changed into the form of a text may be transmitted to the user terminal 100 to be displayed on the display 120, or may be transmitted to the text-to-speech module 260 to be changed into the form of a speech.

According to an embodiment, the text-to-speech module 260 may change the information in the form of a text to information in the form of a speech. The text-to-speech module 260 may receive the information in the form of a text from the natural language generating module 250, and may change the information in the form of a text to information in the form of a speech and transmit the changed information to the user terminal 100. The user terminal 100 may output information in the form of a speech to the speaker 130.

According to an embodiment, the natural language understanding module 220, the path planner module 230, and the dialog manager module 240 may be realized by one module. For example, the natural language understanding module 220, the path planner module 230, and the dialogue manager module 240, which are realized by one module, may determine an intention of the user and a parameter, and may generate a response (e.g., a path rule) corresponding to the determined intention of the user and the determined parameter. Accordingly, the generated response may be transmitted to the user terminal 100.

Figure 1E:
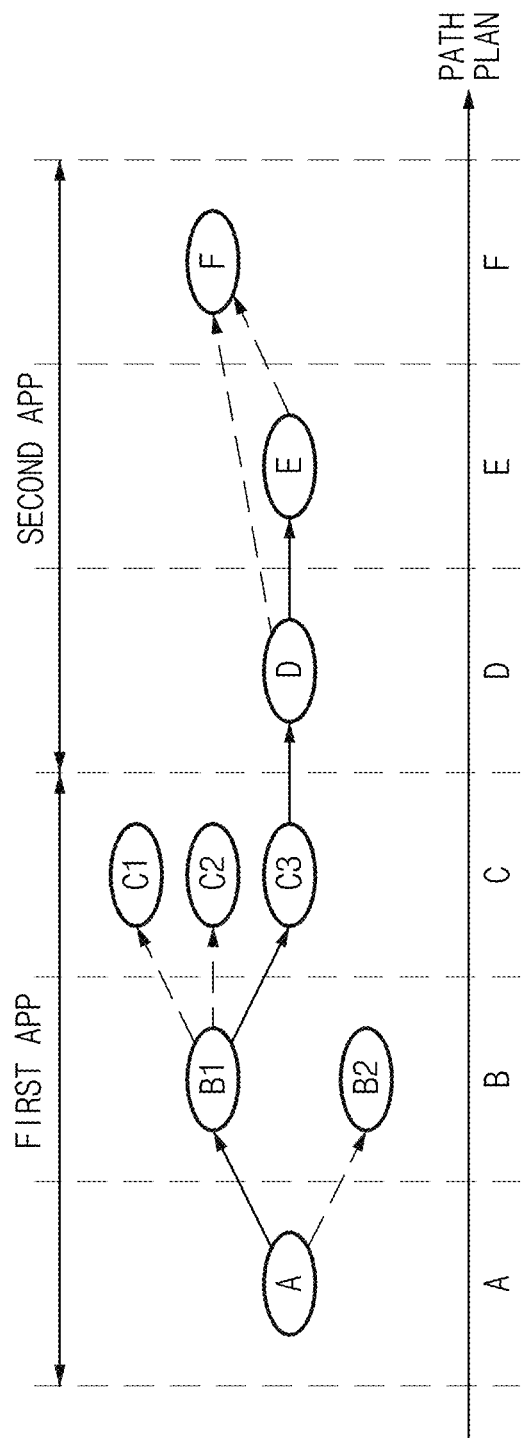
FIG. 1E illustrates a view of a generation form of a path rule according to an embodiment.

FIG. 1E illustrates a view of a generation form of a path rule according to an embodiment.

Referring to FIG. 1E, according to an embodiment, the NLU module 220 may divide the function of an app into unit actions (e.g., A to F) and may store the divided unit actions in the PR DB 231. For example, the NLU module 220 may store a path rule set, which includes a plurality of path rules A-B1-C1, A-B1-C2, A-B1-C3-D-F, and A-B1-C3-D-E-F divided into unit actions, in the PR DB 231.

According to an embodiment, the PR DB 231 of the path planner module 230 may store the path rule set for performing the function of an app. The path rule set may include a plurality of path rules each of which includes a plurality of actions. An action executed depending on a parameter input to each of the plurality of actions may be sequentially arranged in the plurality of path rules. According to an embodiment, the plurality of path rules implemented in a form of ontology or a graph model may be stored in the PR DB 231.

According to an embodiment, the NLU module 220 may select an optimal path rule A-B1-C3-D-F of the plurality of path rules A-B1-C1, A-B1-C2, A-B1-C3-D-F, and A-B1-C3-D-E-F corresponding to the intent of a user input and the parameter.

According to an embodiment, in the case where there is no path rule matched to the user input, the NLU module 220 may transmit a plurality of rules to the user terminal 100. For example, the NLU module 220 may select a path rule (e.g., A-B1) partly corresponding to the user input. The NLU module 220 may select one or more path rules (e.g., A-B1-C1, A-B1-C2, A-B1-C3-D-F, and A-B1-C3-D-E-F) including the path rule (e.g., A-B1) partly corresponding to the user input and may transmit the one or more path rules to the user terminal 100.

According to an embodiment, the NLU module 220 may select one of a plurality of path rules based on an input added by the user terminal 100 and may transmit the selected one path rule to the user terminal 100. For example, the NLU module 220 may select one path rule (e.g., A-B1-C3-D-F) of the plurality of path rules (e.g., A-B1-C1, A-B1-C2, A-B1-C3-D-F, and A-B1-C3-D-E-F) depending on the user input (e.g., an input for selecting C3) additionally entered by the user terminal 100 for the purpose of transmitting the selected one path rule to the user terminal 100.

According to another embodiment, the NLU module 220 may determine the intent of a user and the parameter corresponding to the user input (e.g., an input for selecting C3) additionally entered by the user terminal 100 for the purpose of transmitting the user intent or the parameter to the user terminal 100. The user terminal 100 may select one path rule (e.g., A-B1-C3-D-F) of the plurality of path rules (e.g., A-B1-C1, A-B1-C2, A-B1-C3-D-F, and A-B1-C3-D-E-F) based on the transmitted intent or the transmitted parameter.

As such, the user terminal 100 may complete the actions of the apps 141 and 143 based on the selected one path rule.

According to an embodiment, in the case where a user input in which information is insufficient is received by the intelligence server 200, the NLU module 220 may generate a path rule partly corresponding to the received user input. For example, the NLU module 220 may transmit the partly corresponding path rule to the intelligence agent 151. The intelligence agent 151 may transmit the partly corresponding path rule to the execution manager module 153, and the execution manager module 153 may execute the first app 141 depending on the path rule. The execution manager module 153 may transmit information about an insufficient parameter to the intelligence agent 151 while executing the first app 141. The intelligence agent 151 may make a request for an additional input to a user by using the information about the insufficient parameter. If the additional input is received by the user, the intelligence agent 151 may transmit and process the additional input to the intelligence server 200. The NLU module 220 may generate a path rule to be added, based on the intent of the user input additionally entered and parameter information and may transmit the path rule to be added, to the intelligence agent 151. The intelligence agent 151 may transmit the path rule to the execution manager module 153 and may execute the second app 143.

According to an embodiment, in the case where a user input, in which a portion of information is missed, is received by the intelligence server 200, the NLU module 220 may transmit a user information request to the personal information server 300. The personal information server 300 may transmit information of a user entering the user input stored in a persona database to the NLU module 220. The NLU module 220 may select a path rule corresponding to the user input in which a part of an action is missed, by using the user information. As such, even though the user input in which a portion of information is missed is received by the intelligence server 200, the NLU module 220 may make a request for the missed information to receive an additional input or may determine a path rule corresponding to the user input by using user information.

For example, the integrated intelligent system 10 (see FIG. 10) may involve a series of processes for providing a speech recognition based service. For example, the user terminal 100 (see FIG. 1B) may receive a user input according to an utterance of the user and transmit the received user input to the intelligent server 200 (see FIG. 1D), and the intelligent server 200 may generate (or select) a path rule based on the user input. The user terminal 100 may control a functional operation of a specific app corresponding to the utterance of the user by receiving a path rule from the intelligent server 200 and performing the path rule.

On the above-mentioned process, for example, the user terminal 100 may receive an utterance (e.g., an initial utterance or an additional utterance) of the user including a specific information resource (e.g., an anaphora wording or an ordinal wording). In an embodiment, the user terminal 100 may complete the performance of the path rule by reflecting the specific information resource on a screen related to the performance of the path rule, and may satisfy the intention of the utterance of the user. Hereinafter, examples of operating various speech recognition services of the user terminal, for the utterance of the user including the specific information will be described with reference to FIGS. 2 to 8B.

Figure 2:
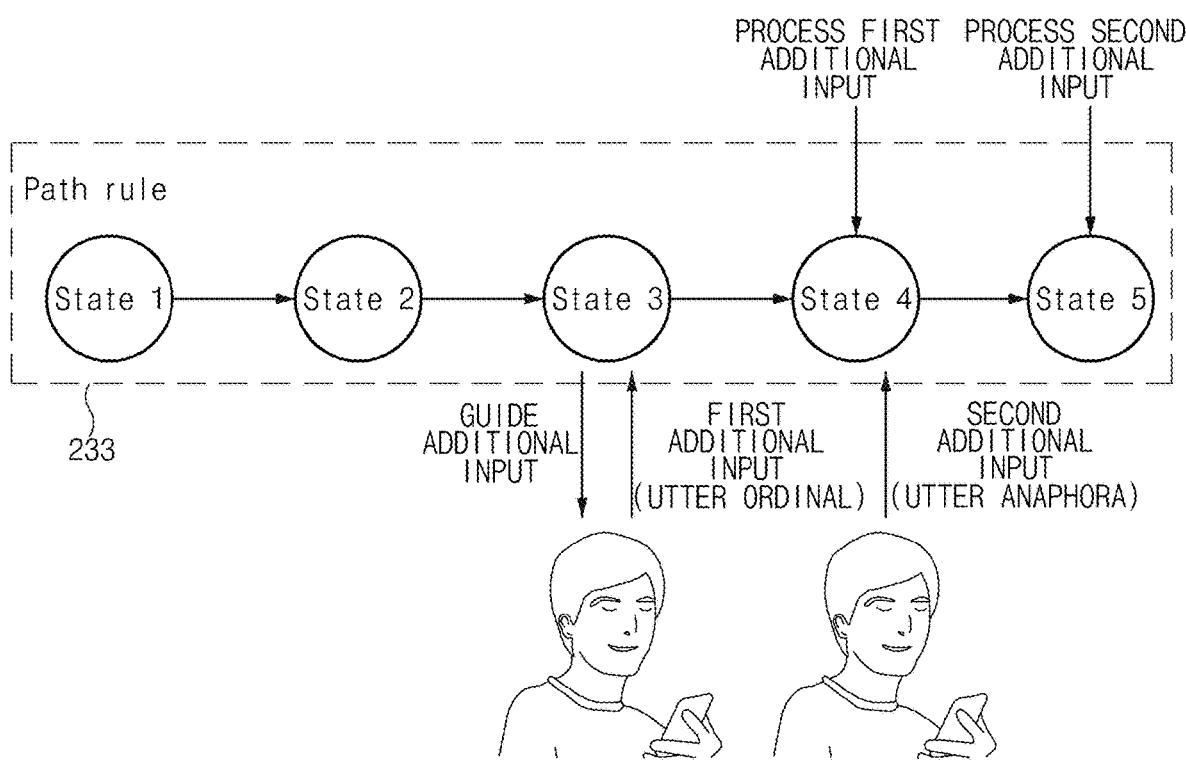
FIG. 2 illustrates a schematic view of a path rule performing process of a user terminal according to an embodiment.

FIG. 2 illustrates a schematic view of a path rule performing process of a user terminal according to an embodiment.

Referring to FIG. 2, the user terminal 100 (see FIG. 1B) may receive an utterance of the user including an intention or a command related to the performance of a specific function (or the performance of a task) of the user terminal 100. The user terminal 100 may transmit a user input according to the utterance of the user to the intelligent server 200 (FIG. 1D), and may receive a path rule 233 (or a sequence) corresponding to the user input from the intelligent server 200. For example, the user terminal 100 may sequentially perform one or more states (states 1 to 5) (or one or more unit operations) constituting the path rule 23.

In an embodiment, the user terminal 100 may perform first to third states (states 1 to 3) including parameter information for performing the states. For example, the user terminal 100 may perform a first state (state 1) (e.g., Execute a picture application.) corresponding to an initial utterance (e.g., Show me the picture taken yesterday.), a second state (state 2) (e.g., Execute a picture search function.), and a third state (state 2) (e.g., Search for the picture dated yesterday.) Thereafter, the user terminal 100 may identify absence of the parameter information for performing the fourth state (state 4) at a time point at which the state is transitted to a state in which the fourth state (state 4) (e.g., Enlarge and display the picture.) may be performed. Accordingly, the user terminal 100 may output a graphical user interface (GUI) that guides (or requests) an additional information input of the user on a screen (e.g., a performance result screen of the third state) related to the third state (state 3).

The user may perform a first additional input including additional information in response to the GUI. In an embodiment, the first additional input may be an input of an utterance (e.g., Select the first picture.) of the user including parameter information (e.g., the first) in an ordinal form, and the user terminal 100 may receive the first additional input and transmit the first additional input to the intelligent server 200. The intelligent server 200 may refine the path rule by adding the first additional input (or parameter information (e.g., the first)) provided from the user terminal 100 to the path rule 233 generated in advance, and may transmit the refined path rule to the user terminal 100.

The user terminal 100 may identify the fourth state (state 4)) in which parameter information is absent on the refined path rule and may perform the fourth state (state 4). In this operation, the user terminal 100 may perform the fourth state (state 4) including the added parameter information based on the screen related to the third state (state 3). For example, the user terminal 100 may complete the performance of the fourth state (state 4) by selecting the first picture corresponding to the added parameter information from the screen that displays at least one picture discovered yesterday in a specific form (e.g., a thumbnail) according to the performance of the third state (state 3) and enlarging and displaying the first picture.

In an embodiment, after the performance result screen including the enlarged first picture is output as the performance of the fourth state (state 4) is completed, the user may further perform a second additional input in the form of an utterance. For example, the user may perform an utterance (e.g., Send this.) of the user including parameter information (e.g., this) in the form of anaphora as a command or an intention for transmitting the first picture. In this case, similarly or correspondingly, the user terminal 100 may transmit a second additional input to the intelligent server 200, and may receive the refined path rule from the intelligent server 200 and perform the refined path rule. The user terminal 100 may perform a fifth state (state 5) (e.g., Select a picture transmission application.) for transmitting the first picture on the screen that is being output, based on the parameter information (e.g., this) included in the refined path rule.

In various embodiments, the first additional input including the parameter information in the ordinal form may be performed at a time at which the result screen of the performance of states of various applications is output. The performance result screen of the states, for example, may include an execution screen of a music application, an execution screen of a text application, an execution screen of a mail application, an execution screen of an application related to control of setting of the user terminal 100, or an execution screen of an address book application, which is displayed in the form in which one or more contents are displayed in the form of a thumbnail or a list.

In various embodiments, the reception of the parameter information in the ordinal form and the reception of the parameter information in the anaphora form of the user terminal 100 are not limited to a parameter information absence situation of the above-mentioned state. For example, the user terminal 100 may receive parameter information of the ordinal form or parameter information of the anaphora form through the initial utterance (e.g., Show me the first picture among the pictures taken yesterday, or Show me the first picture among the pictures taken yesterday and transmit it to mom.) of the user, and may perform a functional operation corresponding to the initial utterance of the user based on the performance of the path rule provided from the intelligent server 200.

Figure 3A:
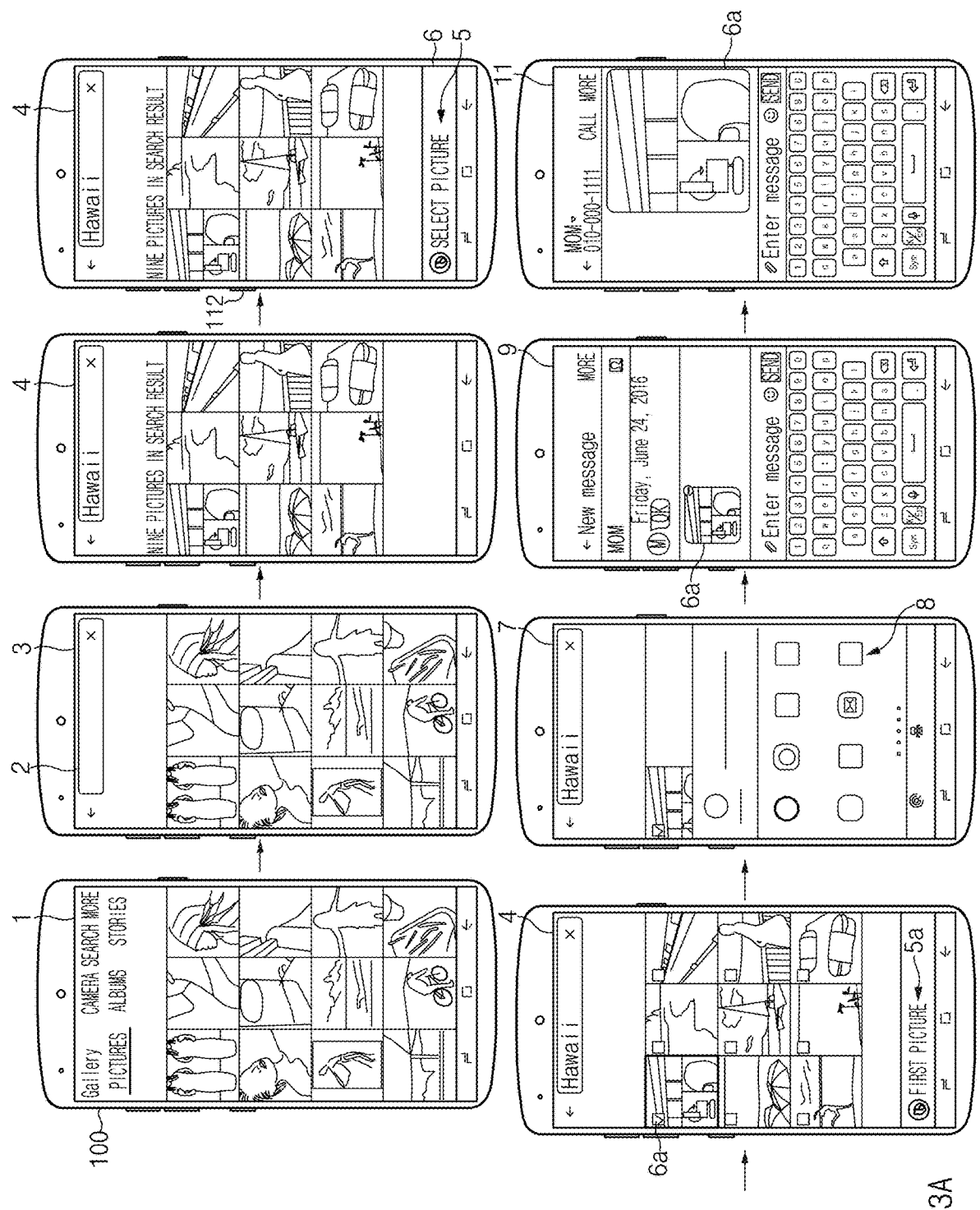
FIG. 3A illustrates a view of an example of a first screen output related to performance of a path rule of a user terminal according to an embodiment.
Figure 3B:
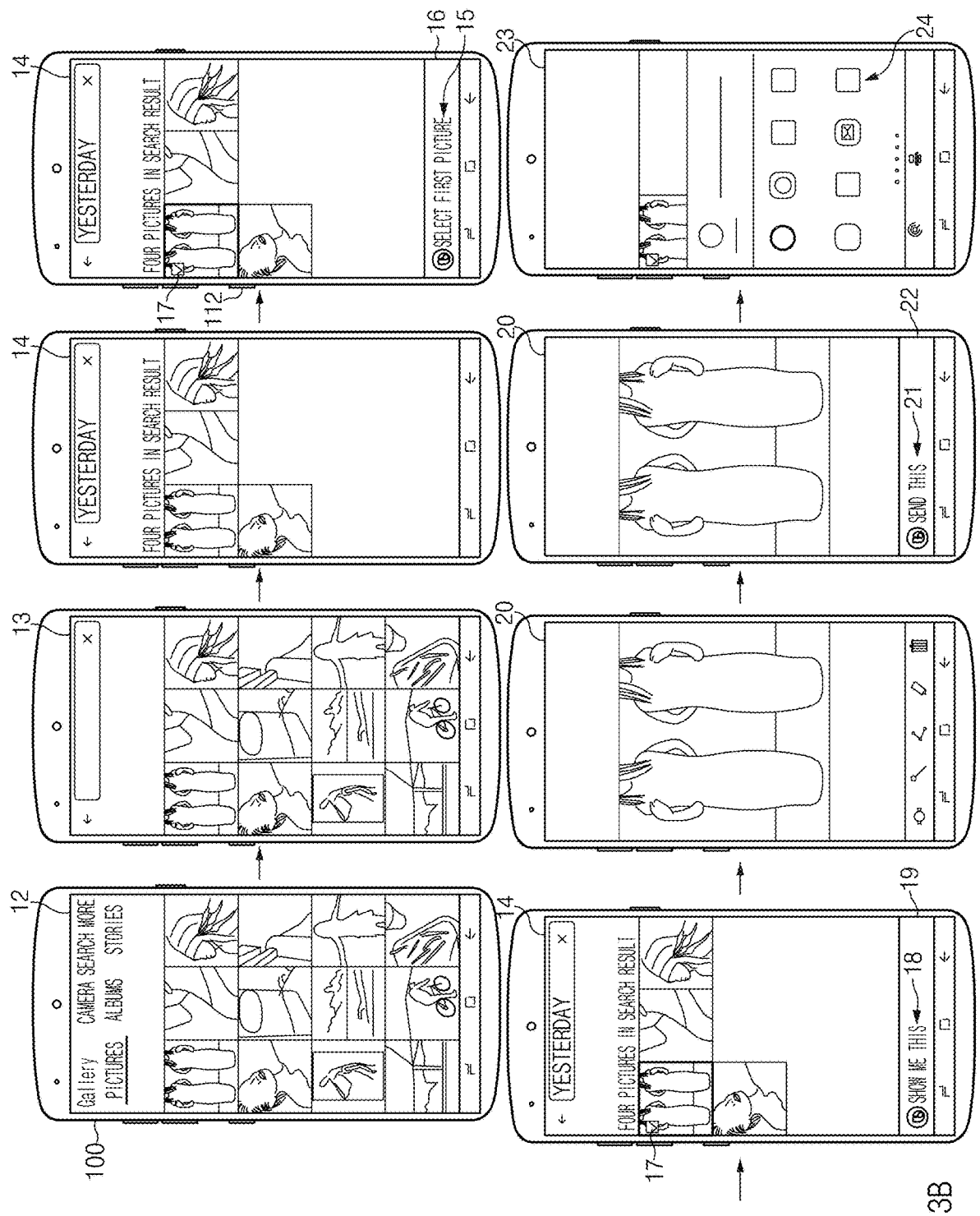
FIG. 3B illustrates a view of an example of a second screen output related to performance of a path rule of a user terminal according to an embodiment.

FIGS. 3A and 3B are views illustrating example of various screen outputs related to performance of a path rule of a user terminal according to an embodiment. The screen output process of the user terminal 100 for processing of an utterance of the user including at least one of parameter information in the ordinal form and parameter information in the anaphora form may be described with reference to FIGS. 3A and 3B.

Referring to FIG. 3A, the user terminal 100 may execute an intelligent app in response to a manipulation of the hardware key 112 (see FIG. 1C) of the user or an utterance of a wakeup command, and may control the intelligent app to a state (e.g., a listening state) in which reception of an utterance of the user is stood by. In response to the execution of the intelligent app, the user may perform an utterance (e.g., Transmit the picture taken in Hawaii to mom.) of the user including a command or an intention related to control of a specific functional operation of the user terminal 100. The user terminal 100 (or the intelligent agent 151 (see FIG. 1B)) may receive a user input according to the utterance of the user, may transmit the user input to the intelligent server 200 (see FIG. 1D), and may receive a path rule corresponding to the utterance of the user from the intelligent server 200. The user terminal 100 may sequentially perform a plurality of (or one or more) states constituting the path rule. For example, the user terminal 100 may perform a first state (e.g., execution of a picture application), a second state (e.g., execution of a picture search function), and a third state (e.g., search for a Hawaii picture) and may output a picture application execution screen 1 that displays at least one picture, a picture application execution screen 3 including a search window 2, and a picture application execution screen 4 that displays at least one Hawaii picture as the performance result screen.

In an embodiment, the user terminal 100 may identify that no picture was selected from the displayed one or more Hawaii pictures (or parameter information related to selection of a picture is absent in the path rule), at a time point at which the state is transitted into a state in which the fourth state (e.g., Select a picture transmission application) may be performed. In this regard, the user terminal 100 (or the intelligent agent 151) may request generation of a related feedback (e.g., Select a picture.) from the natural language generating module 250 (see FIG. 1D) of the intelligent server 200 and receive the feedback, and may display an interface 6 (e.g., a dialogue interface) including a feedback 5 on the picture application execution screen 4 that displays the Hawaii picture.

In an embodiment, in response to the display of the feedback 5, the user may perform the utterance (e.g., the first picture) of the user that specifies a picture by manipulating (e.g., pressing and holding) the hardware key 112, and the first may function as parameter information in the ordinal form. According to the utterance of the user, the user terminal 100 may receive text data obtained by converting the utterance of the user from the intelligent server 200, and may display a text 5a on the picture application execution screen 4 that displays the Hawaii picture. Further, the user terminal 100 may receive a refined path rule from the intelligent server 200 and perform the path rule, and may give a specific display effect 6a (e.g., checking, marking, and processing of a periphery) to a picture of the displayed one or more Hawaii picture, which corresponds to the first arrangement, based on the parameter information (e.g., the first) included in the path rule in the ordinal form.

The user terminal 100 may identify a non-performed state on the refined path rule as a Hawaii picture that is to be transmitted is specified, and may sequentially output a performance completion screen (e.g., a picture transmission application 8 selection screen 7, a selected picture 6a attachment screen 9, or a selected picture 6a transmission screen 11).

Referring to FIG. 3B, by receiving a path rule from the intelligent server 200 according to an utterance (e.g., Show me the picture taken yesterday.) of the user, the user terminal 100 may sequentially output a picture application execution screen 12 that displays at least one picture, a picture application execution screen 13 including a search window, and a picture application execution screen 14 that displays at least one picture dated yesterday. After the picture application execution screen 14 that displays the picture dated yesterday is output, the user may perform an utterance (e.g., Select the first picture) while manipulating the hardware key 112. Accordingly, an interface 16 including a text 15 corresponding to the utterance of the user is displayed on the picture application execution screen 14 displayed the picture dated yesterday, and a specific display effect 17 may be given to a picture which, among the one or more picture dated yesterday, corresponds to the first arrangement.

In an embodiment, the user may further perform at least one utterance related to the selected picture. For example, the user may perform an utterance (e.g., Show me this.) of the user including parameter information (e.g., this) in the form of anaphora in relation to enlargement of the selected picture. The user terminal may display a text 18 corresponding to the utterance of the user and an interface 19 on the picture application execution screen 14 that displays the picture dated yesterday substantially in real time at a time point of the utterance of the user. Further, the user terminal 100 may receive a path rule including parameter information in the anaphora form from the intelligent server 200, and may output a state performance result screen (e.g., a screen 20 including enlargement of the selected picture.) at a time point at which an ending point of the utterance of the user is detected. In this operation, the user may perform another utterance (e.g., Transmit this.) of the user in relation to transmission of the enlarged picture. In this case, similarly to the above description, the user terminal 100 may display a text 21 corresponding to an utterance of the user and an interface 22 on a screen 20 including enlargement of the selected picture and may perform a path rule provided from the intelligent server 200. The user terminal 100 may perform a state (e.g., Select a transmission application of the enlarged picture) with reference to parameter information (e.g., this) in the anaphora form included in the path rule, and may output a screen including at least one transmission application 24 at a time point at which an ending point of the utterance of the user is detected.

The attached following table may represent an exemplary form of a path rule related to processing of an utterance of the user according to an embodiment.

TABLE 1

233

| ID | operation | parameter | |
|---|---|---|---|
| | | parameterName | parameterDescription |
| Gallery_102 | PictureView (25) | NULL | |
| | SearchView (26) | NULL | |
| | SearchViewResult (27) | location | Seoul |
| | | poi | Ever land |
| | | tag | scenary |
| | | title | 20161003_10101 |
| | | time | Yestercay |

TABLE 1-continued

| | | |
|---|---|---|
| | country | France |
| | searchContentType | image/video/all (default) |
| SearchEmptySelectedView (28) | NULL | |
| SearchSelectedView (29) | contentType | image/video/all (default) |
| | selectAl | TRUE/FALSE |
| | selectCount | 3 |
| | selectOrderType | latest/oldest/most latest |
| | ordinalNumber | 1/2/3/last |
| CrossShare(30) | anaphora | this/that/it |

Referring to Table 1, according to an utterance (e.g., Share the picture) of the user, the path rule 233 generated or selected by the intelligent server 200 (see FIG. 1D) may include at least one state 25, 26, 27, 28, 29, or 30. For example, the at least one state may correspond to at least one of execution of a picture application (PicturesView) 25, execution of a picture search function (SearchView) 26, output of a search result display screen (SearchViewResult) 27, output of a display screen of a search result in which a picture is not selected (SearchEmptySelectedView) 28, output of a display screen of a search result in which at least one picture is selected (SearchSelectedView) 29, and output of a sharing application selection screen (CrossShare) 30.

In an embodiment, the above-mentioned parameter information in the ordinal form may be included in a state of the output of a display screen of a search result in which at least one picture is selected 29, and for example, the ordinal (e.g., the first) may be converted to numeral 1. Alternatively, an ordinal (e.g., last) in another form may be converted to a letter of 'last' and be included in the state of the output of a display screen of a search result in which at least one picture is selected 29. In an embodiment, the utterance of the user may include a plurality of pieces of parameter information (e.g., the first and the third) in the ordinal form, and in this case, the plurality of ordinals may be converted to numerals 1 and 3, respectively, and may be included in the state of the output of a display screen of a search result in which at least one picture is selected 29.

In an embodiment, the parameter information in the anaphora form may be included in the state of the output 30 of a sharing application selection screen, and the anaphora (e.g., this) may be converted to a letter of 'this'. In various embodiments, the utterance of the user including the parameter information in the ordinal form may be performed at a time point of the output of a performance result screen of the states 25, 26, 27, and 28 before the state of the output of a display screen of a search result in which at least one picture is selected 29. Correspondingly, the utterance of the user including the parameter in the ordinal form may be performed at a time point of the output of the performance result screen of the states 25, 26, 27, 28, and 29 before the state of the output 30 a sharing application selection screen.

Figure 4A:
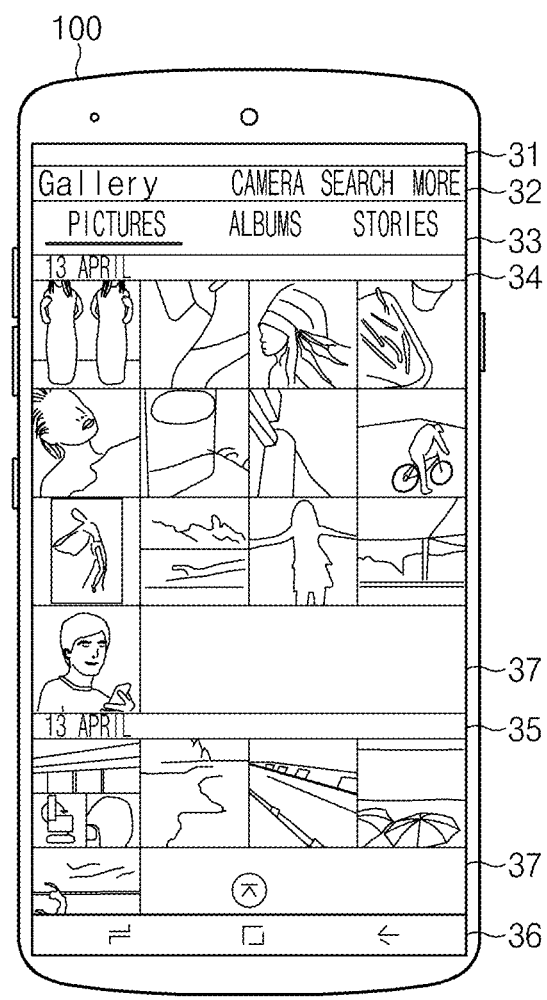
FIG. 4A illustrates a view of an example of a third screen output related to performance of a path rule of a user terminal according to an embodiment.
Figure 4B:
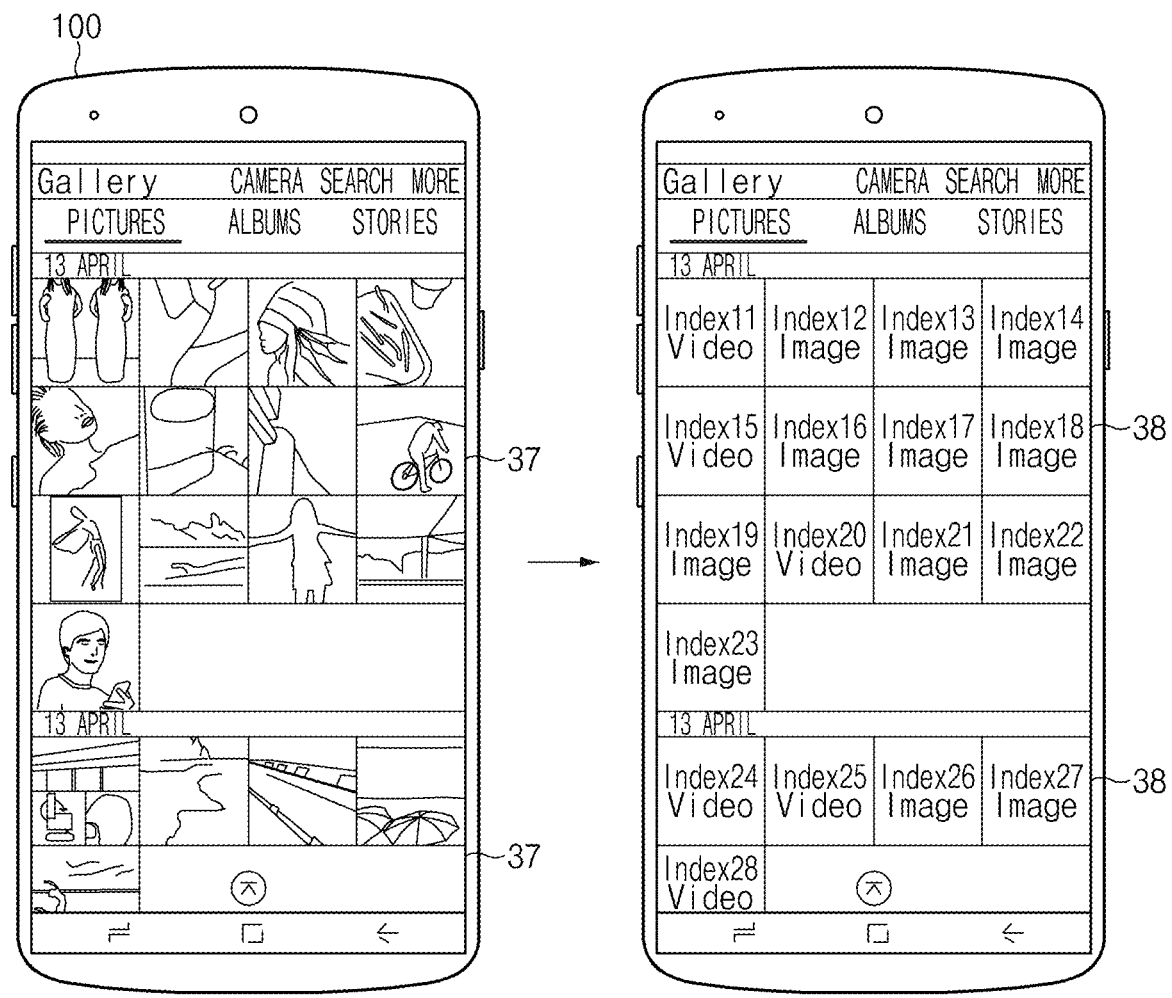
FIG. 4B illustrates a view of a form in which at least one piece of index information is mapped with a third screen according to an embodiment.

FIG. 4A illustrates a view of a third screen output example related to performance of a path rule of a user terminal according to an embodiment. FIG. 4B is a view illustrating a form in which at least one piece of index information is mapped with the third screen according to an embodiment.

Referring to FIGS. 4A and 4B, in an embodiment, the user terminal 100 may calculate an area allocated to the plurality of contents included on a performance result screen (e.g., a picture application execution screen that displays a plurality of contents) of a specific state. For example, the user terminal 100 may calculate an area 37 allocated to the plurality of contents by subtracting the areas of areas (e.g., a user terminal operating information area 31, an application menu area 32, an application tab menu area 33, one or more group information areas 34 and 35, and a software key area 36) that are irrelevant from the plurality of contents from a total area of the performance result screen. In an embodiment, the user terminal 100 may determine the number of contents that may be displayed on the area 37 allocated to the plurality of contents, based on thumbnail area information of the contents stored in the content data base 145 (see FIG. 1B). The user terminal 100 may determine an arrangement of one or more pieces of index information 38 that function as identifier or arrangement sequence information for unit contents based on the determined number of contents, and may map the index information 38 with the unit contents, respectively.

As another scheme, the user terminal 100 may calculate an area allocated to the plurality of contents for the performance result screen of the specific state similarly to the above description. In an embodiment, the user terminal 100 may acquire a thumbnail area of the unit contents based on information on the content database 145 (see FIG. 1B), and accordingly, may derive the number and arrangement structure of the plurality of contents by comparing the area allocated to the plurality of contents and the thumbnail area of the unit contents. The user terminal 100 may calculate the arrangement or number of the index information based on the derived number and arrangement, and may map the index information with the unit contents, respectively.

In relation to the above description, the user terminal 100 may reflect the parameter information in the ordinal form included in the path rule on specific contents based on the index information. Then, when the parameter information (e.g., the thirtieth) in the ordinal form included in the utterance of the user exceeds the number (e.g., 20) of the plurality of contents displayed on the performance result screen of the specific state, the user terminal 100 may output a specific feedback (e.g., Select another picture.) as the index information corresponding to the parameter information in the ordinal form is absent.

FIGS. 5A to 5D are views illustrating various processing forms of an utterance of the user according to an embodiment.

In an embodiment, when a path rule including parameter information in the ordinal form or parameter information in the anaphora form is performed, the performance of a specific state related to the parameter information may be based on a screen (or a performance result screen of a state before the specific state) that is being currently output by the user terminal 100. In this regard, referring to FIG. 5A, the user may manipulate the hardware key 112 in a state in which the user terminal 100 outputs a specific screen (e.g., a picture application execution screen that displays a plurality of pictures), and may perform an utterance of the user including parameter information (e.g., the first) in the ordinal form. In this case, the user terminal 100 may receive the path rule including the parameter of the ordinal form from the intelligent server 200 (FIG. 1D), and may perform a state corresponding to the parameter information in the ordinal form. According to the performance of the state, the user terminal 100 may give a specific display effect 39 to the first picture corresponding to the parameter information in the ordinal form on the screen that is being currently output. If a plurality of arrangements of pictures displayed on the screen according to a control of the user (e.g., manipulation of a screen scroll) are changed (e.g., the screen is scrolled and a specific picture is changed from a first arrangement 40*a* to a second arrangement 40*b*) before the utterance of the user is performed, the user terminal 100 may determine the first picture corresponding to the parameter of the ordinal form is a picture located in the second arrangement 40*b*.

Figure 5A:
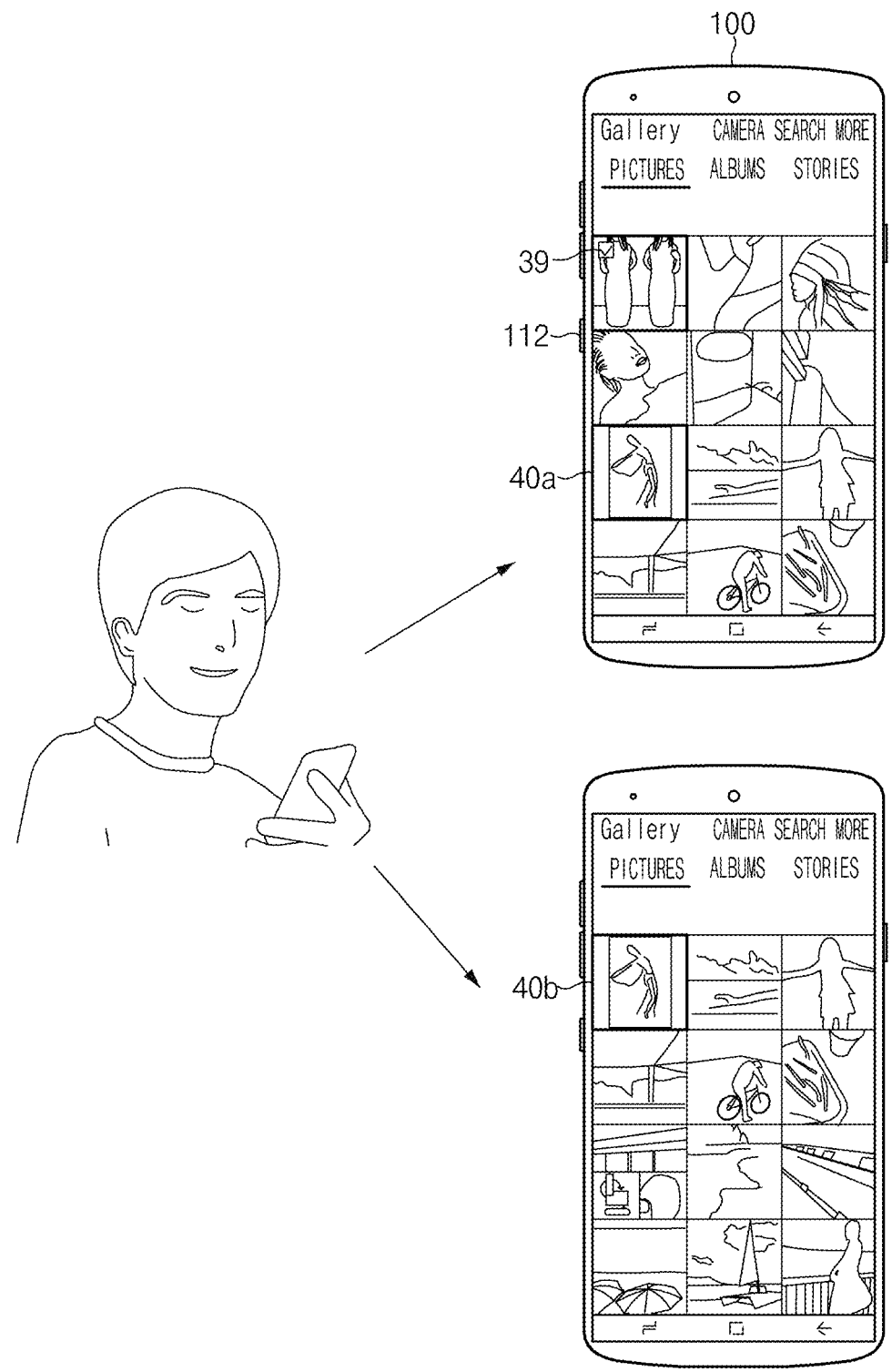
FIG. 5A illustrates a view of a first processing form of an utterance of the user according to an embodiment.
Figure 5B:
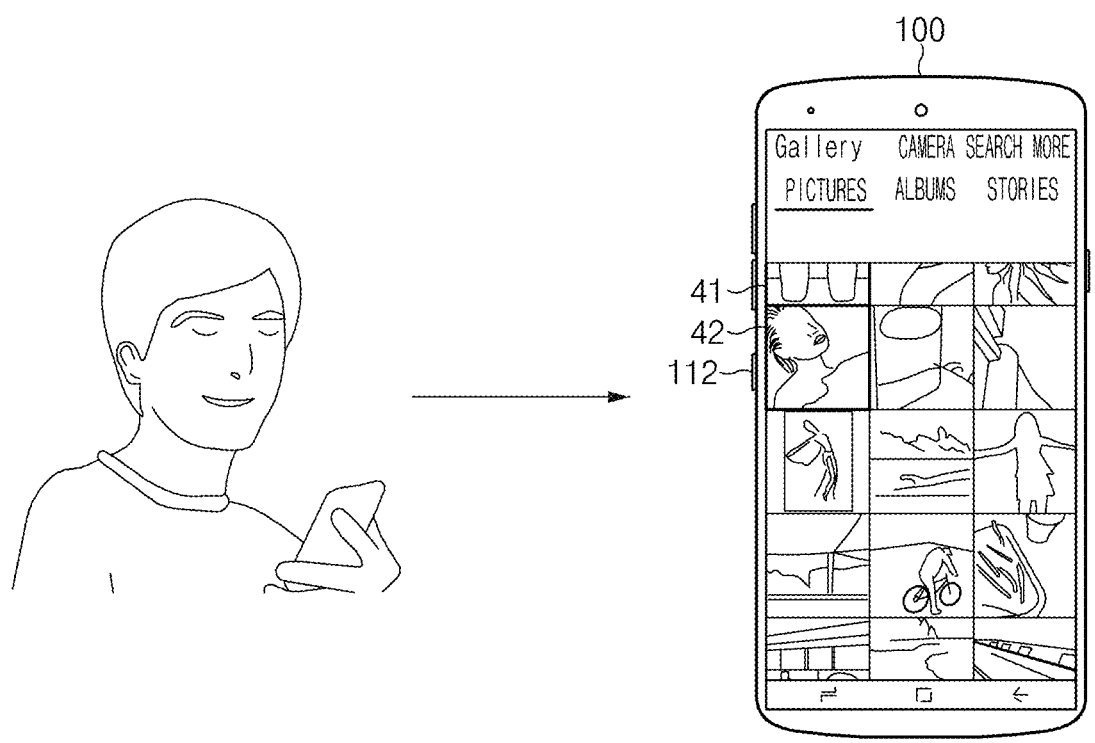
FIG. 5B illustrates a view of a second processing form of an utterance of the user according to an embodiment.

Referring to FIG. 5B, in relation to the scroll manipulation of the user, the screen output from the user terminal 100 may include (or display) only a part of the first picture 41. In an embodiment, when performing the state related to the parameter information in the ordinal form, the user terminal 100 may compare the area or size of a first picture 41 corresponding to the first arrangement of the plurality of pictures displayed with those of the other pictures. When the area or size of the first picture 41 is a specific threshold ratio or less with respect to those of the other pictures, the user terminal 100 may determine that a second picture 42 that is adjacent to the first picture 41 as the first picture on a row of the first picture 41. Alternatively, in various embodiments, the user terminal 100 may determine the pictures, only at least parts of which are displayed, as one arrangement regardless of the area of the picture displayed on the screen that is being output. In this case, if the user performs an utterance of the user including parameter information (e.g., the first) in the ordinal form, a first picture 41, only at least a portion of which is displayed, may be determined as the first picture in response to the parameter information in the ordinal form.

Figure 5C:
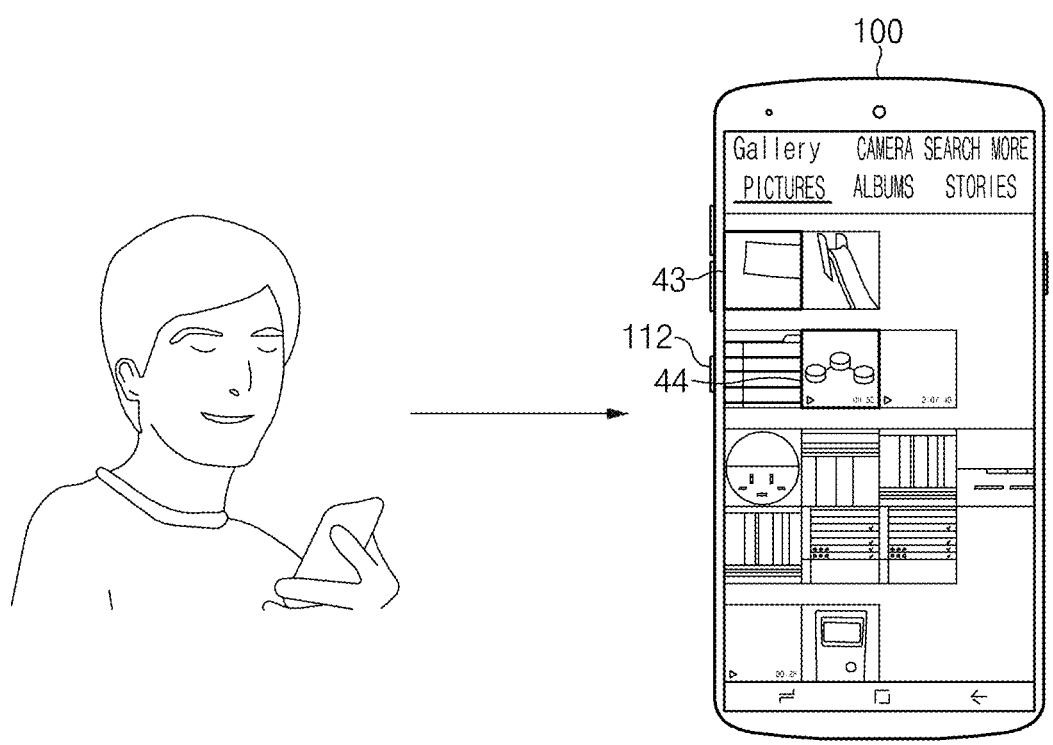
FIG. 5C illustrates a view of a third processing form of an utterance of the user according to an embodiment.

Referring to FIG. 5C, the performance result screen output according to the performance of the state of the user terminal 100 may include a plurality of contents (e.g., an image, a video, or a document) having various attributes (e.g., the kinds of contents). In an embodiment, the plurality of contents may be arranged on the performance result screen according to an attribute, according to setting of the user, or according to contents generation information (e.g., a date, a time, or a location). In this regard, when the user performs an utterance (e.g., Show me the first image.) of the user including the parameter information (e.g., the first) in the ordinal form, the user terminal 100 may determine the first image corresponding to the parameter information in the ordinal form based on the attribute information the plurality of contents displayed. In an embodiment, the attribute information of the contents may include type information, such as an image, a video, or a document. Then, a dynamic GIF, a captured image, a motion photo, or an image including an audio may be applied to the image. Alternatively, as the video, a fast motion video, a 3D video, a 180 degree video, or a 360 degree video may be applied. Alternatively, as mentioned above, the attribute information of the contents may include information, such as a location, a date, or a time at which the contents are generated (or captured).

In an embodiment, the user terminal 100 may determine the image contents located first as the first image corresponding to the parameter information of the ordinal form by counting one or more image contents of the arrangement of the plurality of contents, except for contents having an attribute of a video. Correspondingly, when the user performs an utterance (e.g., Show me the first video.) related to a video, the user terminal 100 may determine video contents of the first arrangement by counting the plurality of contents of the arrangement, except for contents having an attribute of an image.

In various embodiments, the user terminal 100 may process an utterance (e.g., Show me the first continuous picture) of the user including the features of the contents and the parameter information of the ordinal form, similarly to the above description. For example, the user terminal 100 may identify the features of the one or more contents included in the screen that is being displayed with reference to the content database 145 (see FIG. 1B), and may determine the first picture corresponding to the parameter information of the ordinal form by counting only image contents among the contents having continuous features corresponding to the utterance of the user. Alternatively, the user terminal 100 may process an utterance (e.g., Share the picture taken just before) of the user based on content attribute information (e.g., a data, a time, or a location). For example, the user terminal 100 may identify the contents captured and stored finally based on the time information of the contents. As another example, the user terminal 100 may process an utterance (e.g., Share the first picture taken in Seoul.) of the user based on the content attribute information. In this regard, the user terminal 100 may identify contents including location information (e.g., Seoul) corresponding to the utterance of the user based on the location information of the content attribute information, and may process an intention or a command (e.g., Share) by determining contents corresponding to an ordinal (e.g., the first) on the utterance of the user on the screen on which the identified contents are displayed.

Figure 5D:
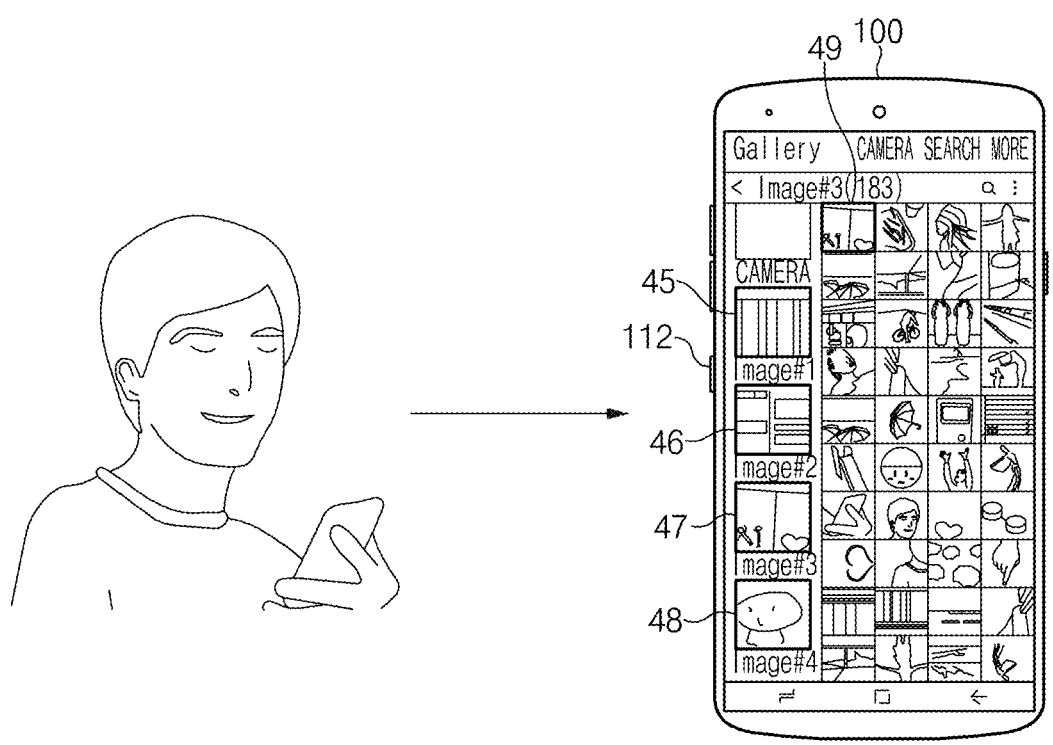
FIG. 5D illustrates a view of a fourth processing form of an utterance of the user according to an embodiment.

Referring to FIG. 5D, the performance result screen output according to the performance of the state of the user terminal 100 may include one or folders (e.g., a first folder 45, a second folder 46, a third folder 47, or a fourth folder 48) that are obtained by classifying the plurality of contents according to a reference (e.g., a content generation date, a content generation location, or an attribute of contents). In this regard, when the user performs an utterance (e.g., Show me the first picture in the third folder) of the user including parameter information of an ordinal form while specifying the folder, the user terminal 100 may determine the first picture 49 by counting the image contents of the one or more contents included in the third folder based on the performance of the path rule for the utterance of the user.

Figure 6A:
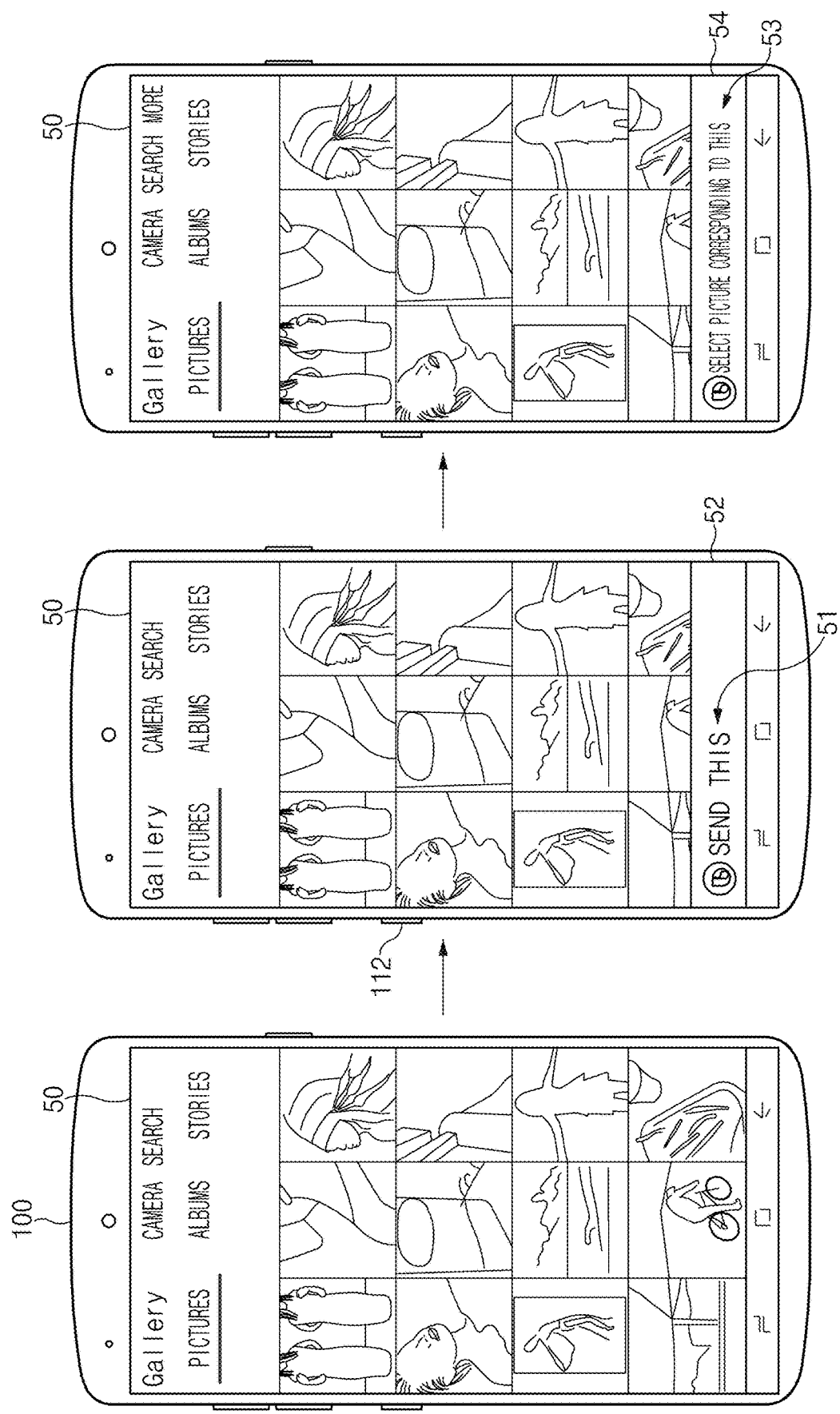
FIG. 6A illustrates a view of a fifth processing form of an utterance of the user according to an embodiment.
Figure 6B:
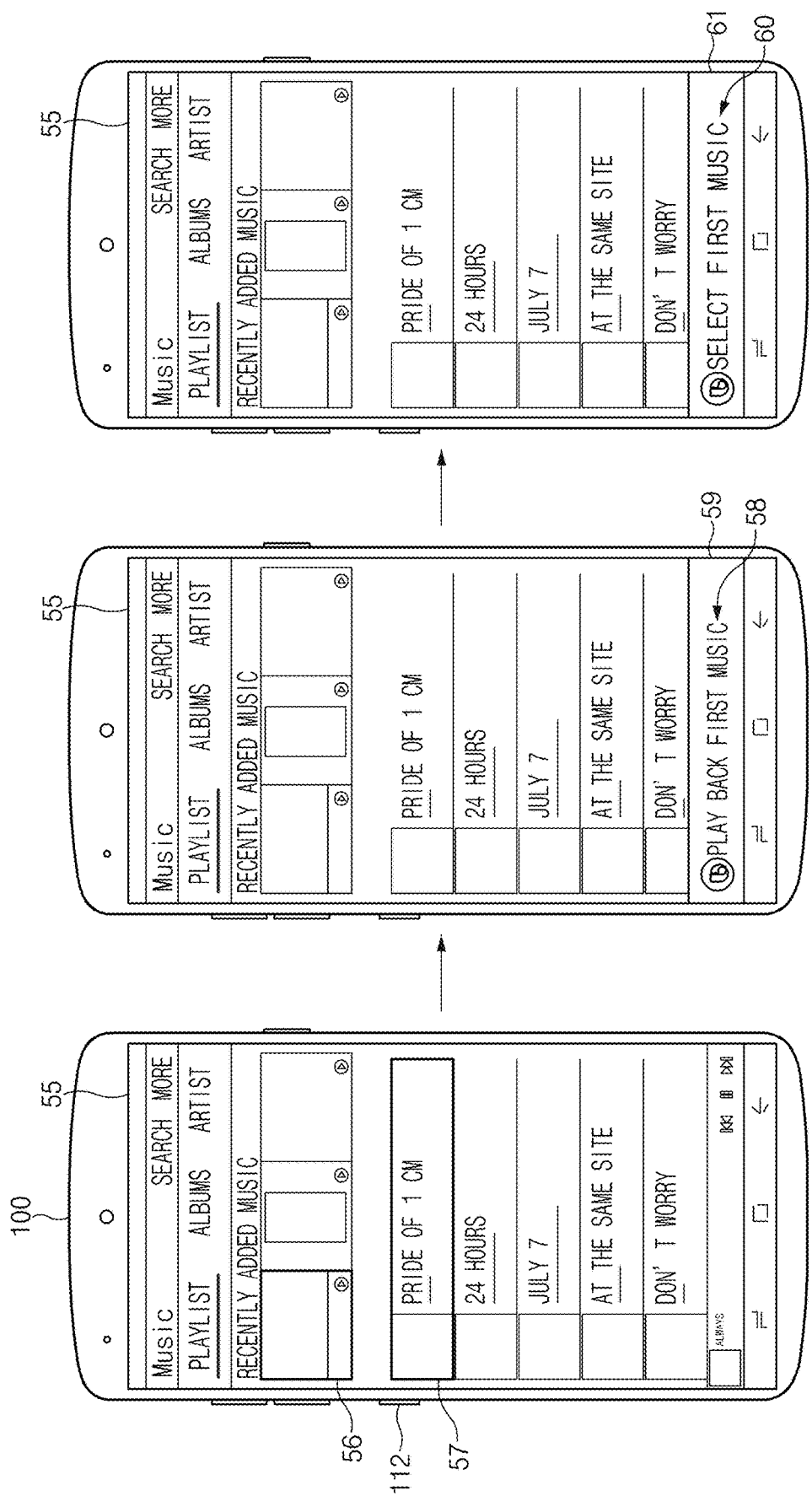
FIG. 6B illustrates a view of a sixth processing form of an utterance of the user according to an embodiment.

FIGS. 6A to 6B are views illustrating various processing forms of an utterance of the user according to another embodiment.

Referring to FIG. 6A, in response to an initial utterance of the user containing a command or an intention related to control of a specific functional operation of the user terminal 100, the user terminal 100 may perform a path rule and may output a performance result screen 50 (e.g., a picture application execution screen that displays a plurality of pictures) of a specific state. In this operation, the user may perform an utterance (e.g., Transmit this) of the user including parameter information (e.g., this) in the anaphora form based on a manipulation of the hardware key 112, and correspondingly, the user terminal 100 may display a text 51 provided from the intelligent server 200 (see FIG. 1D) and an interface 52 including the text 51 on the performance result screen 50.

In an embodiment, the user terminal; 100 may identify that a picture which, among a plurality of pictures displayed on the performance result screen 50, corresponds to parameter information (e.g., this) in the anaphora form is not present (or that it is impossible to determine a picture which, among the plurality of pictures, corresponds to the utterance of the user) in an operation of receiving the refined path rule from the intelligent server 200 and performing the refined path rule according to an utterance of the user. In this case, the user terminal 100 may request the natural language generating module 250 (see FIG. 1D) of the intelligent server 200 to generate a related feedback, and may display an interface 54 including a feedback 53 (e.g., Select a picture corresponding to this.).

Referring to FIG. 6B, in the same way as or similarly to the above description, the user terminal 100 may perform a path rule for the initial utterance of the user and may output a result screen 55 (e.g., a music application execution screen that displays a plurality of media file and a music list) according to the completion of the performance of a specific state. In an embodiment, the areas or sizes allocated to the media file 56 (e.g., a music video) and a music list 57 may be different from each other. Alternatively, the media file 56 and the music list 57 may be displayed on the result screen 55 in an irregular arrangement. If the user manipulates the hardware key 112 and performs an utterance (e.g., Play back the first music.) including the parameter information (e.g., the first) in the ordinal form, a text 58 corresponding to the utterance of the user and an interface 59 may be displayed. Meanwhile, even when the refined path rule is performed, the user terminal 100 may determine contents corresponding to the parameter information in the ordinal form unclearly as the areas or sizes of the contents are different or the arrangement of the contents is irregular. In this case, the user terminal 100 may exclude determination of contents corresponding to the utterance of the user, and may request the natural language generating module 250 to generate a related feedback. The user terminal 100 may display a feedback 60 (e.g., Select the first music.) that guides or requests an additional utterance (or an additional information input) of the user on the result screen 55 based on the interface 61.

Figure 7:
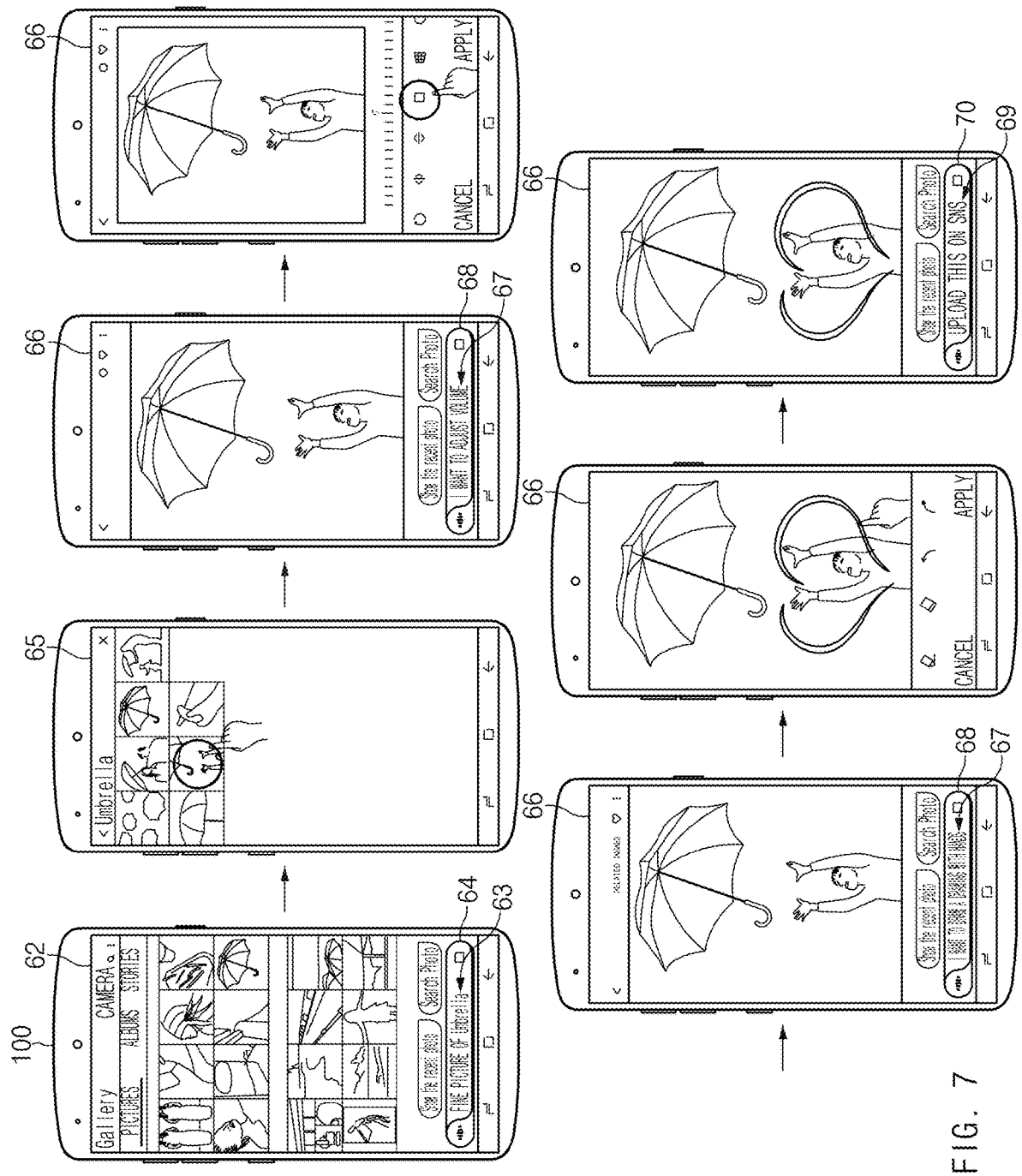
FIG. 7 illustrates a view of a user input processing form based on multi-models according to an embodiment.

FIG. 7 illustrates a view of a user input processing form based on multi-models (e.g., a speech input and a touch input) according to an embodiment.

Referring to FIG. 7, in an operation of outputting a performance result screen 62 (e.g., a picture application execution screen that displays a plurality of pictures) of a specific state of the user terminal 100, a text 63 corresponding to an utterance (e.g., Find the picture of an umbrella.) of the user and an interface 64 including the text 63 may be displayed. The user terminal 100 may transmit the utterance of the user to the intelligent server 200 (FIG. 1D) and may receive a path rule that is refined while reflecting an utterance (or parameter information (e.g., an umbrella)) of the user. The user terminal 100 may perform the refined path rule and may output a screen 65 that displays one or more umbrella pictures.

In an embodiment, the user may select a specific picture of the one umbrella pictures displayed based on a touch input using a part (e.g., a finger) of the body of the user. Correspondingly, the screen 65 that displays the one or more umbrella pictures may be converted to a screen 66 that enlarges the specific picture. Thereafter, the user may perform an additional utterance (e.g., I want to adjust the size.), and the user terminal 100 may output a text 67 corresponding to the additional utterance and an interface 68 and may output a picture size adjustment screen 66 by receiving and performing the path rule according to the additional utterance. Then, the user may control the size of the picture on the picture size adjustment screen 66 based on a touch input.

In an embodiment, the user may further perform an utterance (e.g., I want to draw a drawing with a hand.) of the user including a specific command or intention for the picture, of which the size has been changed, and the utterance may be displayed based on an interface 68 including a text 67 corresponding to the utterance. The user terminal 100 may support a control (e.g., illustration of a drawing) of the user based on a touch input by performing a path rule according to an additional utterance. Thereafter, the user may further perform an utterance (e.g., Upload this on an SNS.) for sharing the controlled picture, and accordingly, the user terminal 100 may output a text 69 corresponding to the utterance and an interface 70.

According to various embodiments, an electronic device may include a display, a microphone, at least one speaker, a wireless communication circuit, a memory including at least one application, and a processor electrically connected to the display, the microphone, the at least one speaker, the wireless communication circuit, and the memory.

According to various embodiments, the processor may be configured to receive an utterance of a user through the microphone, transmit data related to the utterance of the user to an external device through the wireless communication circuit, receive a response including sequence information of states of the electronic device from the external device through the wireless communication circuit, determine whether at least one of parameter information related to an ordinal or parameter information related to anaphora is present on the response, and store at least one instruction to apply the parameter information to a screen output through the display at a second time point before a first time point at which a presence of the parameter information is determined.

According to various embodiments, the processor may be further configured to calculate an area allocated to a plurality of contents on the screen output at the second time point, and map index information with unit contents determined according to the area.

According to various embodiments, the processor may be further configured to apply the parameter information related to the ordinal to contents that, among the plurality of contents included on the screen output of the second time point, correspond to the parameter information related to the ordinal, based on the index information at the first time point.

According to various embodiments, the processor may be further configured to when areas or sizes of the plurality of contents included in the screen output of the second time point are different from each other or irregularly arranged, exclude application of the parameter information related to the ordinal.

According to various embodiments, the processor may be further configured to when the application of the parameter information related to the ordinal is excluded, request creation of a related feedback from an external server.

According to various embodiments, the processor may be further configured to apply the parameter information related to the anaphora to contents that, among the plurality of contents included on the screen output of the second time point, are selected in advance, at the first time point.

According to various embodiments, the processor may be further configured to when an arrangement of the plurality of contents displayed on the screen output of the second time point, correspondingly change an arrangement of the index information.

According to various embodiments, the processor may be further configured to compare an area of contents that, among the plurality of contents displayed on the screen output of the second time point, correspond to a periphery of an area allocated to the plurality of contents with an area of the other contents.

According to various embodiments, the processor may be further configured to when a ratio of the area of the contents corresponding to the periphery to the area for the other contents is a specific threshold ratio or less, exclude the index information for the contents corresponding to the periphery from the application of the parameter information related to the ordinal.

According to various embodiments, the processor may be further configured to identify an attribute of the plurality of contents displayed on the screen output of the second time point, and determine application of the parameter information related to the ordinal for one or more contents including an attribute corresponding to the utterance of the user.

According to various embodiments, an electronic device may include a housing, a touchscreen display disposed in an interior of the housing and exposed through a first part of the housing, a microphone disposed in the interior of the housing and exposed through a second part of the housing, at least one speaker disposed in the interior of the housing and exposed through a third part of the housing, a wireless communication circuit disposed in the interior of the housing, a memory disposed in the interior of the housing, wherein the memory is configured to store an application program including a user interface for displaying one or a plurality of items, and a processor disposed in the interior of the housing and electrically connected to the display, the microphone, the at least one speaker, the wireless communication circuit, and the memory.

According to various embodiments, the processor may be configured to display a user interface including the one or the plurality of items on the display, receive a first user utterance through the microphone while the user interface is displayed, wherein the first user utterance includes a first request for executing a first task by using at least one item that, among the one or the plurality of items, is specified by the first user utterance, transmit first data related to the first user utterance to an external server through the wireless communication circuit, receive a first response from the external server through the wireless communication circuit, wherein the first response includes information on a first sequence of states of the electronic device for executing the first task and the first response further includes numbers and locations of the one or the plurality of items in the user interface, and execute the first task including an operation of allowing the application program to select the one or the plurality of items based on the numbers or the locations.

According to various embodiments, the application program may include at least one of a picture application program, a document editing application program, an address book application program, a music application program, and an application program or a mail application program related to control of setting of the electronic device.

According to various embodiments, the first user utterance may include at least one of an ordinal or anaphora.

According to various embodiments, the first response may include a medium parameter name or a slot value related to the one or the plurality of items.

According to various embodiments, the slot value may include a number.

According to various embodiments, a system may include an electronic device including a housing, a touchscreen display disposed in an interior of the housing and exposed through a first part of the housing, a microphone disposed in the interior of the housing and exposed through a second part of the housing, at least one speaker disposed in the interior of the housing and exposed through a third part of the housing, a wireless communication circuit disposed in the interior of the housing, a first memory disposed in the interior of the housing, wherein the first memory includes an application program including a user interface for displaying one or a plurality of items, and a first processor disposed in the interior of the housing and electrically connected to the display, the microphone, the at least one speaker, the wireless communication circuit, and the first memory, and a first server including a communication interface, a second memory, wherein the second memory includes at least one of an automatic speech recognition (ARS) module, a natural language understanding (NLU) module, and a natural language generator module, and a second processor electrically connected to the communication interface, and the second memory.

According to various embodiments, the first processor may be configured to store at least one command for displaying a user interface including the one or the plurality of items on the display, receive a first user utterance including a first request for executing a first task by using at least one item of the one or the plurality of items through the microphone while the user interface is displayed, and transmit first data associated with the first user utterance through the wireless communication circuit to the first server.

According to various embodiments, the second processor may be configured to process the first data by using the automatic speech recognition module and the natural language understanding module, and create a first response including at least one of information on a first sequence of states of the electronic device for executing the first task based on at least a part of the first data, numbers that denote the one or the plurality of items, and locations that represents the one or the plurality of items, transmit the first response to the first processor through the communication interface.

According to various embodiments, the application program may be configured to execute the first task including an operation of allowing the application program to select the one or the plurality of items based on the numbers or the locations.

Figure 8A:
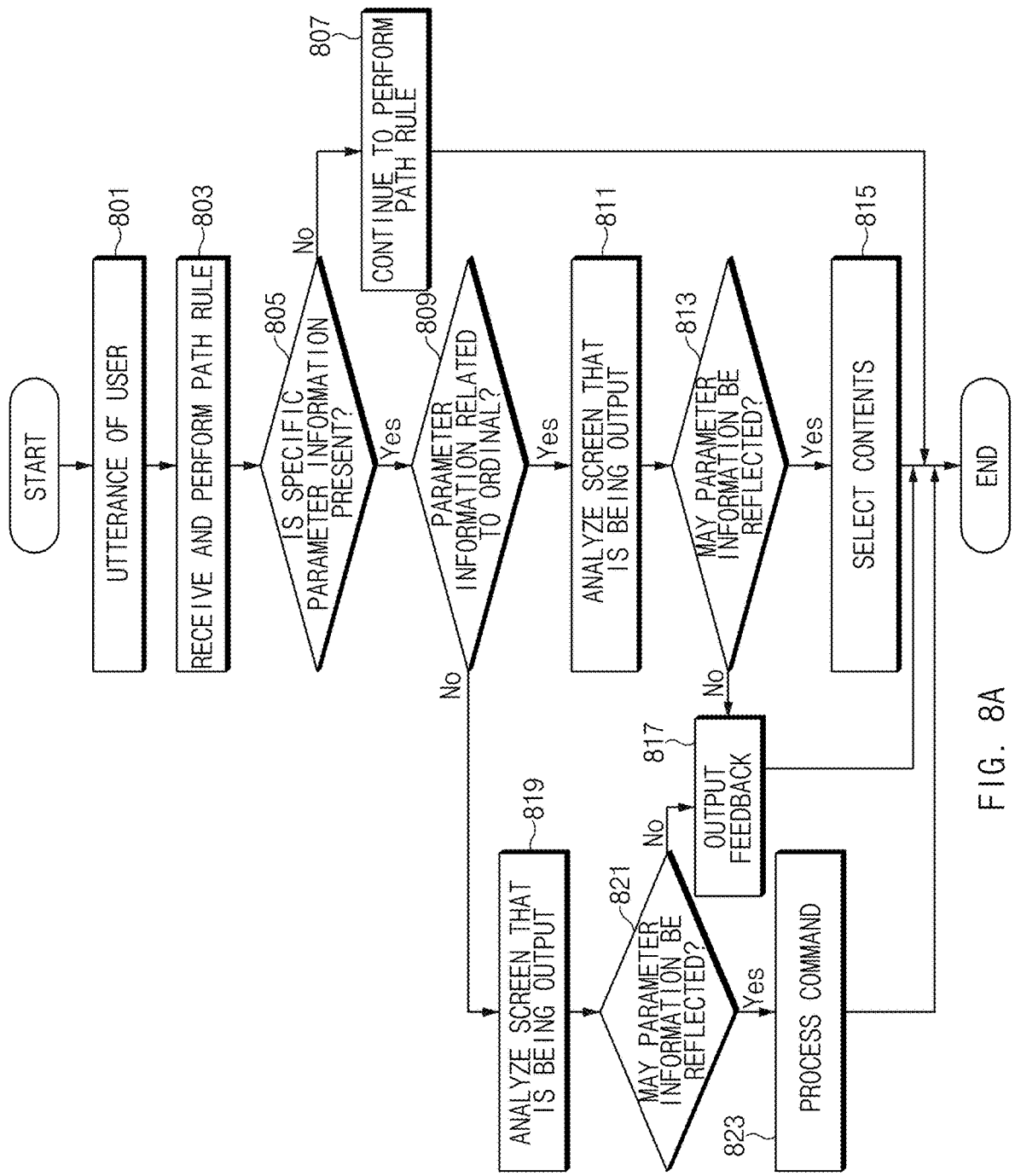
FIG. 8A illustrates a view of a process for user utterance processing of a user terminal according to an embodiment.

FIG. 8A illustrates a view of a process for user utterance processing of a user terminal according to an embodiment.

Referring to FIG. 8A, in operation 801, the user terminal 100 (see FIG. 1B) (e.g., the processor 150 (see FIG. 1B)) may receive an utterance of the user containing an intention related to performance of a specific function of the user terminal or a task. For example, the user terminal may execute an intelligent app that supports an operation of a speech recognition service in response to a control (e.g., a manipulation of the hardware key 112 (see FIG. 1C) or an utterance of a wakeup command) of the user, and may receive the utterance of the user based on the microphone 111 (see FIG. 1C) provided in one area.

In operation 803, the user terminal (e.g., the processor 150 (see FIG. 1B) may transmit a user input according to an utterance of the user to the intelligent server 200 (see FIG. 1D), and may receive a path rule (or a sequence) corresponding to the user input from the intelligent server. For example, the user terminal may perform the path rule by sequentially processing one or more states (or, one or more unit operations) that constitute the path rule.

In operation 805, the user terminal (e.g., the processor 150 (see FIG. 1B) may determine whether specific parameter information (e.g., parameter information in the ordinal form or parameter information in the anaphora form) is present on the received path rule in an operation of performing the one or more states. In this regard, the intelligent agent 151 (see FIG. 1D) of the user terminal may deliver the received path rule to the execution manager module 153 (see FIG. 1D). The execution manager module may deliver a first state to an execution service 141*a* or 143*a* (see FIG. 1B) in an application corresponding to an intention of an utterance of the user. The execution service may execute the first state based on the parameter information corresponding to the first state, and in this operation, the execution service may identify whether the specific parameter information is present on the path rule and may deliver the information to the intelligent agent based on the execution manager module. When it is determined by the identification operation of the execution service that the specific parameter information is not present, in operation 807, the user terminal (e.g., the processor 150 (see FIG. 1B) may perform one or more states on the received path rule.

When it is determined in operation 805 that the specific parameter information is present on the path rule, in operation 809, the user terminal (e.g., the processor 150 (see FIG. 1B)) may determine whether the parameter information determined to be present is related to an ordinal. In an embodiment, when it is determined that parameter information (e.g., the first or the first and the fourth) related to the ordinal is present on the path rule, as in operation 811, the user terminal (e.g., the processor 150 (see FIG. 1B)) may analyze a screen (e.g., a performance result screen of a state before the state corresponding to the parameter information related to the ordinal) that is being currently output. For example, the user terminal may analyze, for example, the number of contents included on the screen that is being output, the thumbnail area of the contents, and the arrangement structure of the plurality of contents, and may map the index information with the contents.

In operation 813, the user terminal (e.g., the processor 150 (see FIG. 1B)) may determine whether the parameter information related to the ordinal may be reflected on the screen that is being currently output. In an embodiment, when the thumbnail areas of the plurality of contents displayed on the screen that is being currently output is different from each other or irregular, in operation 817, the user terminal may exclude the parameter information related to the ordinal from the reflection and output a specific feedback (e.g., Please select.).

Alternatively, when it is determined that the parameter information related to the ordinal may be reflected, in operation 815, the user terminal (e.g., the processor 150 (see FIG. 1B)) may determine and select the contents corresponding to the ordinal parameter information based on the index information mapped with the plurality of contents, respectively. In this regard, a plurality of pieces of parameter information (e.g., the first and the fourth) related to the ordinal may be present on the path rule, and the user terminal may determine and select the contents corresponding to the plurality of pieces of parameter information, respectively, in the above-mentioned scheme. The user terminal may continue to perform the path rule by performing a state corresponding to an intention of the user related to the ordinal parameter information after or upon the selection of the determined selection.

In operation 809, when it is determined that the specific parameter information is not parameter information related to an ordinal, the user terminal (e.g., the processor 150 (see FIG. 1B)) may determine the specific parameter information as parameter information related to anaphora. In this case, in operation 819, the user terminal (e.g., the processor 150 (see FIG. 1B)) may analyze the screen that is being current output. For example, the user terminal may determine whether contents (or selected contents or contents display in a single) corresponding to the anaphora are present in the one or more contents included in the screen that is being currently output.

In various embodiments, at least one of operations 811 and 819 may be excluded. In this regard, the analysis of the screen that is being currently output may be performed as an operation before an operation (operation 805) of determining whether specific parameter information is present on the path rule, and in this case, at least one of operations 811 and 819 may be excluded.

In operation 821, the user terminal (e.g., the processor 150 (see FIG. 1B)) may determine whether the parameter information related to the anaphora may be reflected on the screen that is being currently output. For example, the user terminal may determine whether contents selected to correspond to the anaphora is present in the plurality of contents displayed on the screen. Alternatively, the user terminal may determine whether it is unnecessary to determine whether anaphora corresponds to the plurality of contents (e.g., when a single content is displayed on the screen). If contents corresponding to the anaphora are absent, the user terminal (e.g., the processor 150 (see FIG. 1B) may output a specific feedback as in operation 817.

Alternatively, when contents corresponding to the anaphora are present (e.g., contents that are selected or display in a single are present), in operation 823, the user terminal (e.g., the processor 150 (see FIG. 1B)) may process an intention of an utterance of the user for the contents corresponding to anaphora.

In various embodiments, operations 809, 819, 821, and 823 may be excluded. This may be a case in which for the path rule received in operation 803, the specific parameter information, the presence of which is determined in operation 805, is understood as the parameter information of the ordinal form. In other words, when operations 809, 819, 821, and 823 are excluded, FIG. 8A may correspond to a process of processing an utterance of the user that may include parameter information of an ordinal form.

Figure 8B:
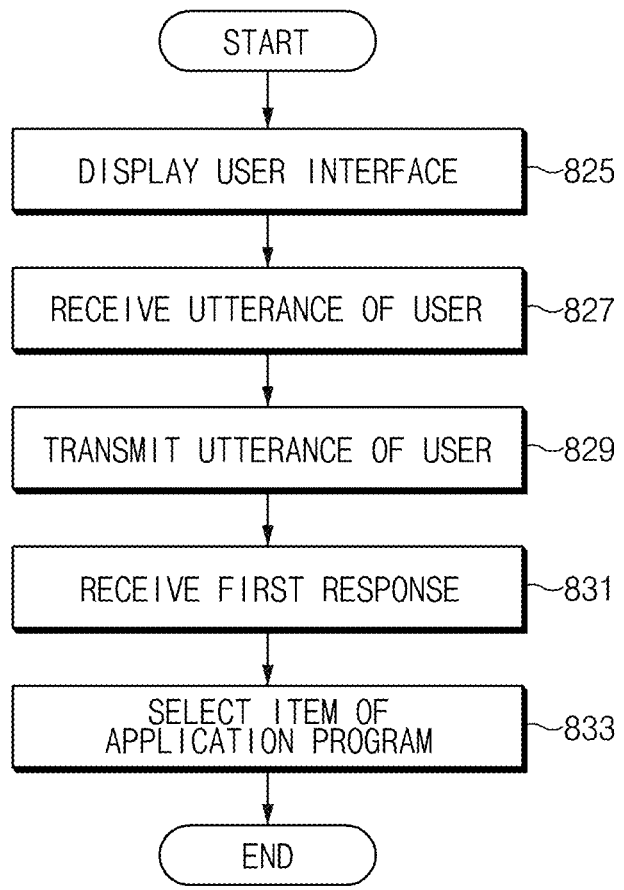
FIG. 8B illustrates a view of a method of operating a speech recognition service of a user terminal according to an embodiment.

FIG. 8B illustrates a view of a method of operating a speech recognition service of a user terminal according to an embodiment.

Referring to FIG. 8B, in operation 825, the user terminal 100 (see FIG. 1B) (e.g., the processor 150 (see FIG. 1B)) may output a user interface (or a screen) including a plurality of items (or a plurality of contents (an image, a video, a document, or the like)). In an embodiment, the user interface may be understood as a performance result screen of a specific state in relation to the performance of the path rule of the user terminal.

In operation 827, the user terminal (e.g., the processor 150 (see FIG. 1B)) may receive an utterance of the user in a state in which a user interface is output. For example, the user terminal may receive a user input according to the utterance of the user based on the microphone 111 (see FIG. 1C) provided in one area. In an embodiment, the utterance of the user may include a request, a command, or an intention for performing a task related to control of a functional operation of the user terminal based on an operation of at least one of the plurality of items.

In operation 829, the user terminal (e.g., the processor 150 (see FIG. 1B)) may transmit an utterance (or a user input) of the user received based on a wireless communication circuit to the external server (e.g., the intelligent server 200 (see FIG. 1B)). Accordingly, in operation 831, the user terminal (e.g., the processor 150 (see FIG. 1B) may receive a response (e.g., a path rule or a sequence) corresponding to the user input according to the utterance of the user from the external server. In an embodiment, the response may include sequence information, number information (a number 1 obtained by converting an ordinal (the first) mapped with the item, text information (e.g., a letter (last) obtained by converting an ordinal (last)) mapped with the item, or location information (e.g., location or coordinate information in the user interface area) for the item, for at least one state of the user terminal that is used for performing the task.

In operation 833, an application program (or an application) of the user terminal may select a corresponding item from the plurality of items included in the user interface, based on the number information, the text information, or the location information included in the response. The user terminal may process the response by performing a state related to the number information, the text information, or the location information after or upon the selection of the corresponding item.

According to various embodiments, a method for operating a speech recognition service of an electronic device may include receiving a user utterance and transmitting related data to an external device that performs communication with the electronic device, receiving a response including sequence information of states of the electronic device from the external device, determining whether at least one of parameter information related to an ordinal or parameter information related to anaphora is present on the response, and applying the parameter information to a screen output at a second time point before a first time point, at which presence of the parameter information is determined.

According to various embodiments, the method may further include calculating an area allocated to a plurality of contents on the screen output at the second time point, and mapping index information with unit contents determined according to the area.

According to various embodiments, the applying of the parameter information may include applying the parameter information related to the ordinal to contents that, among the plurality of contents included on the screen output of the second time point, correspond to the parameter information related to the ordinal, based on the index information at the first time point.

According to various embodiments, the applying of the parameter information may include applying the parameter information related to the anaphora to contents that, among the plurality of contents included on the screen output of the second time point, are selected in advance, at the first time point.

Figure 9:
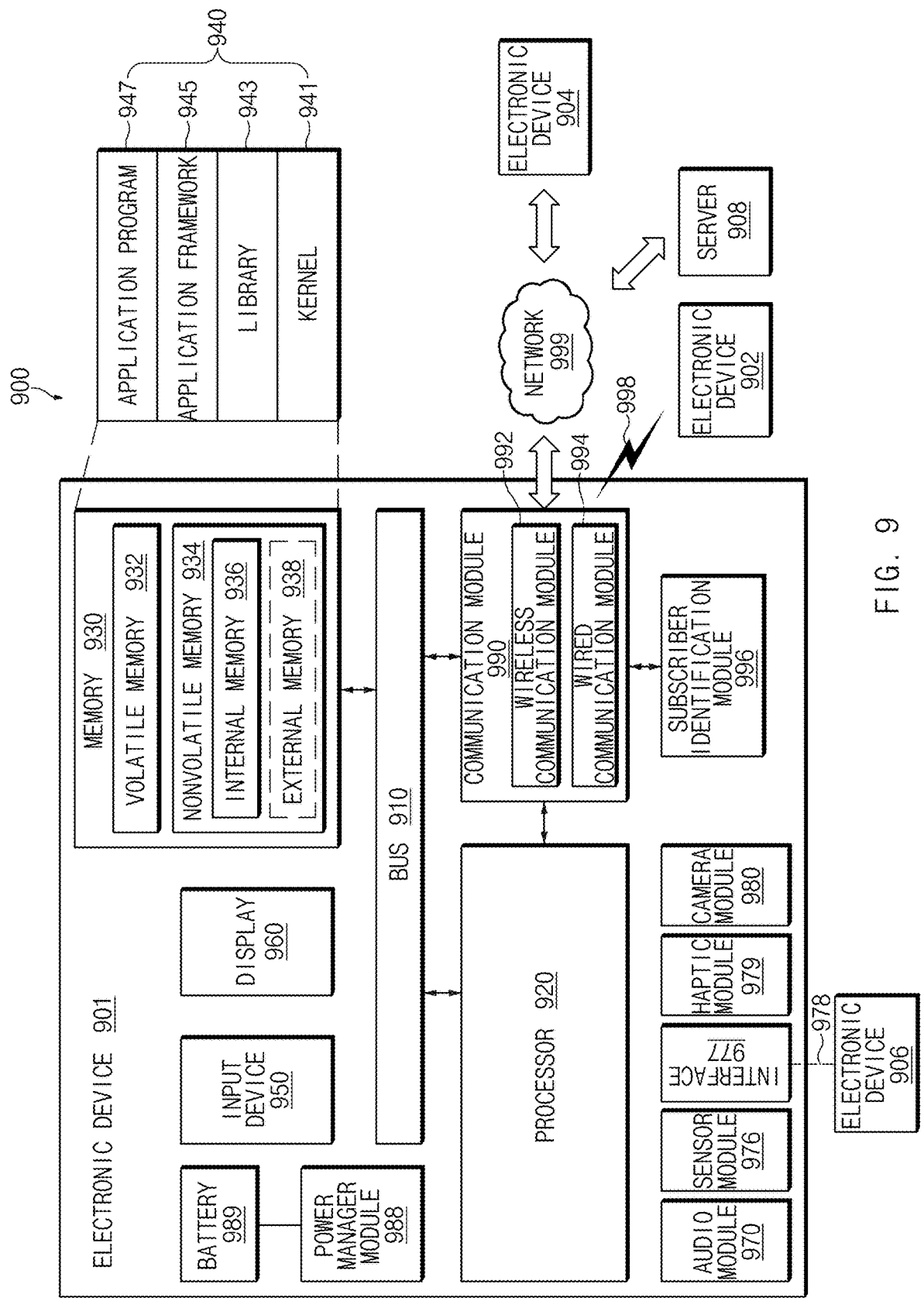
FIG. 9 illustrates an electronic device in a network environment according to an embodiment.

FIG. 9 illustrates an electronic device (or user terminal) in a network environment according to an embodiment.

Referring to FIG. 9, under the network environment 900, the electronic device 901 (e.g., the user terminal 100 of FIG. 1B) may communicate with an electronic device 902 through local wireless communication 998 or may communication with an electronic device 904 or a server 908 through a network 999. According to an embodiment, the electronic device 901 may communicate with the electronic device 904 through the server 908.

According to an embodiment, the electronic device 901 may include a bus 910, a processor 920, a memory 930, an input device 950 (e.g., a micro-phone or a mouse), a display 960, an audio module 970, a sensor module 976, an interface 977, a haptic module 979, a camera module 980, a power management module 988, a battery 989, a communication module 990, and a subscriber identification module 996. According to an embodiment, the electronic device 901 may not include at least one (e.g., the display 960 or the camera module 980) of the above-described elements or may further include other element(s).

For example, the bus 910 may interconnect the above-described elements 920 to 990 and may include a circuit for conveying signals (e.g., a control message or data) between the above-described elements. The processor 920 may include one or more of a central processing unit (CPU), an application processor (AP), a graphic processing unit (GPU), an image signal processor (ISP) of a camera or a communication processor (CP). According to an embodiment, the processor 920 may be implemented with a system on chip (SoC) or a system in package (SiP). For example, the processor 920 may drive an operating system (OS) or an application to control at least one of another element (e.g., hardware or software element) connected to the processor 920 and may process and compute various data. The processor 920 may load a command or data, which is received from at least one of other elements (e.g., the communication module 990), into a volatile memory 932 to process the command or data and may store the process result data into a nonvolatile memory 934.

The memory 930 may include, for example, the volatile memory 932 or the nonvolatile memory 934. The volatile memory 932 may include, for example, a random access memory (RAM) (e.g., a dynamic RAM (DRAM), a static RAM (SRAM), or a synchronous dynamic RAM (SDRAM)). The nonvolatile memory 934 may include, for example, a one-time programmable read-only memory (OTPROM), a programmable read-only memory (PROM), an erasable programmable read-only memory (EPROM), an electrically erasable programmable read-only memory (EEPROM), a mask ROM, a flash ROM, a flash memory, a hard disk drive, or a solid-state drive (SSD). In addition, the nonvolatile memory 934 may be configured in the form of an internal memory 936 or the form of an external memory 938 which is available through connection only if necessary, according to the connection with the electronic device 901. The external memory 938 may further include a flash drive such as compact flash (CF), secure digital (SD), micro secure digital (Micro-SD), mini secure digital (Mini-SD), extreme digital (xD), a multimedia card (MMC), or a memory stick. The external memory 938 may be operatively or physically connected with the electronic device 901 in a wired manner (e.g., a cable or a universal serial bus (USB)) or a wireless (e.g., Bluetooth) manner.

For example, the memory 930 may store, for example, at least one different software element, such as an instruction or data associated with the program 940, of the electronic device 901. The program 940 may include, for example, a kernel 941, a library 943, an application framework 945 or an application program (interchangeably, "application") 947.

The input device 950 may include a microphone, a mouse, or a keyboard. According to an embodiment, the keyboard may include a keyboard physically connected or a keyboard virtually displayed through the display 960.

The display 960 may include a display, a hologram device or a projector, and a control circuit to control a relevant device. The screen may include, for example, a liquid crystal display (LCD), a light emitting diode (LED) display, an organic LED (OLED) display, a microelectromechanical systems (MEMS) display, or an electronic paper display. According to an embodiment, the display may be flexibly, transparently, or wearably implemented. The display may include a touch circuitry, which is able to detect a user's input such as a gesture input, a proximity input, or a hovering input or a pressure sensor (interchangeably, a force sensor) which is able to measure the intensity of the pressure by the touch. The touch circuit or the pressure sensor may be implemented integrally with the display or may be implemented with at least one sensor separately from the display. The hologram device may show a stereoscopic image in a space using interference of light. The projector may project light onto a screen to display an image. The screen may be located inside or outside the electronic device 901.

The audio module 970 may convert, for example, from a sound into an electrical signal or from an electrical signal into the sound. According to an embodiment, the audio module 970 may acquire sound through the input device 950 (e.g., a microphone) or may output sound through an output device (not illustrated) (e.g., a speaker or a receiver) included in the electronic device 901, an external electronic device (e.g., the electronic device 902 (e.g., a wireless speaker or a wireless headphone)) or an electronic device 906 (e.g., a wired speaker or a wired headphone) connected with the electronic device 901.

The sensor module 976 may measure or detect, for example, an internal operating state (e.g., power or temperature) or an external environment state (e.g., an altitude, a humidity, or brightness) of the electronic device 901 to generate an electrical signal or a data value corresponding to the information of the measured state or the detected state. The sensor module 976 may include, for example, at least one of a gesture sensor, a gyro sensor, a barometric pressure sensor, a magnetic sensor, an acceleration sensor, a grip sensor, a proximity sensor, a color sensor (e.g., a red, green, blue (RGB) sensor), an infrared sensor, a biometric sensor (e.g., an iris sensor, a fingerprint senor, a heartbeat rate monitoring (HRM) sensor, an e-nose sensor, an electromyography (EMG) sensor, an electroencephalogram (EEG) sensor, an electrocardiogram (ECG) sensor, a temperature sensor, a humidity sensor, an illuminance sensor, or an UV sensor. The sensor module 976 may further include a control circuit for controlling at least one or more sensors included therein. According to an embodiment, the sensor module 976 may be controlled by using the processor 920 or a processor (e.g., a sensor hub) separate from the processor 920. In the case that the separate processor (e.g., a sensor hub) is used, while the processor 920 is in a sleep state, the separate processor may operate without awakening the processor 920 to control at least a portion of the operation or the state of the sensor module 976.

According to an embodiment, the interface 977 may include a high definition multimedia interface (HDMI), a universal serial bus (USB), an optical interface, a recommended standard 232 (RS-232), a D-subminiature (D-sub), a mobile high-definition link (MHL) interface, a SD card/MMC interface, or an audio interface. A connector 978 may physically connect the electronic device 901 and the electronic device 906. According to an embodiment, the connector 978 may include, for example, an USB connector, an SD card/MMC connector, or an audio connector (e.g., a headphone connector).

The haptic module 979 may convert an electrical signal into mechanical stimulation (e.g., vibration or motion) or into electrical stimulation. For example, the haptic module 979 may apply tactile or kinesthetic stimulation to a user. The haptic module 979 may include, for example, a motor, a piezoelectric element, or an electric stimulator.

The camera module 980 may capture, for example, a still image and a moving picture. According to an embodiment, the camera module 980 may include at least one lens (e.g., a wide-angle lens and a telephoto lens, or a front lens and a rear lens), an image sensor, an image signal processor, or a flash (e.g., a light emitting diode or a xenon lamp).

The power management module 988, which is to manage the power of the electronic device 901, may constitute at least a portion of a power management integrated circuit (PMIC).

The battery 989 may include a primary cell, a secondary cell, or a fuel cell and may be recharged by an external power source to supply power at least one element of the electronic device 901.

The communication module 990 may establish a communication channel between the electronic device 901 and an external device (e.g., the first external electronic device 902, the second external electronic device 904, or the server 908). The communication module 990 may support wired communication or wireless communication through the established communication channel. According to an embodiment, the communication module 990 may include a wireless communication module 992 or a wired communication module 994. The communication module 990 may communicate with the external device (e.g., the first external electronic device 902, the second external electronic device 904 or the server 908) through a first network 998 (e.g. a wireless local area network such as Bluetooth or infrared data association (IrDA)) or a second network 999 (e.g., a wireless wide area network such as a cellular network) through a relevant module among the wireless communication module 992 or the wired communication module 994.

The wireless communication module 992 may support, for example, cellular communication, local wireless communication, and global navigation satellite system (GNSS) communication. The cellular communication may include, for example, long-term evolution (LTE), LTE Advance (LTE-A), code division multiple access (CMA), wideband CDMA (WCDMA), universal mobile telecommunications system (UMTS), wireless broadband (WiBro), or global system for mobile communications (GSM). The local wireless communication may include wireless fidelity (Wi-Fi), Wi-Fi Direct, light fidelity (Li-Fi), Bluetooth, Bluetooth low energy (BLE), Zigbee, near field communication (NFC), magnetic secure transmission (MST), radio frequency (RF), or a body area network (BAN). The GNSS may include at least one of a global positioning system (GPS), a global navigation satellite system (Glonass), Beidou Navigation Satellite System (Beidou), the European global satellite-based navigation system (Galileo), or the like. In the present disclosure, "GPS" and "GNSS" may be interchangeably used.

According to an embodiment, when the wireless communication module 992 supports cellar communication, the wireless communication module 992 may, for example, identify or authenticate the electronic device 901 within a communication network using the subscriber identification module (e.g., a SIM card) 996. According to an embodiment, the wireless communication module 992 may include a communication processor (CP) separate from the processor 920 (e.g., an application processor (AP)). In this case, the communication processor may perform at least a portion of functions associated with at least one of elements 910 to 996 of the electronic device 901 in substitute for the processor 920 when the processor 920 is in an inactive (sleep) state, and together with the processor 920 when the processor 920 is in an active state. According to an embodiment, the wireless communication module 992 may include a plurality of communication modules, each supporting only a relevant communication scheme among cellular communication, short-range wireless communication, or a GNSS communication scheme.

The wired communication module 994 may include, for example, include a local area network (LAN) service, a power line communication, or a plain old telephone service (POTS).

For example, the first network 998 may employ, for example, Wi-Fi direct or Bluetooth for transmitting or receiving instructions or data through wireless direct connection between the electronic device 901 and the first external electronic device 902. The second network 999 may include a telecommunication network (e.g., a computer network such as a LAN or a WAN, the Internet or a telephone network) for transmitting or receiving instructions or data between the electronic device 901 and the second electronic device 904.

According to embodiments, the instructions or the data may be transmitted or received between the electronic device 901 and the second external electronic device 904 through the server 908 connected with the second network. Each of the external first and second external electronic devices 902 and 904 may be a device of which the type is different from or the same as that of the electronic device 901. According to various embodiments, all or a part of operations that the electronic device 901 will perform may be executed by another or a plurality of electronic devices (e.g., the electronic devices 902 and 904 or the server 908). According to an embodiment, in the case that the electronic device 901 executes any function or service automatically or in response to a request, the electronic device 901 may not perform the function or the service internally, but may alternatively or additionally transmit requests for at least a part of a function associated with the electronic device 901 to any other device (e.g., the electronic device 902 or 904 or the server 908). The other electronic device (e.g., the electronic device 902 or 904 or the server 908) may execute the requested function or additional function and may transmit the execution result to the electronic device 901. The electronic device 901 may provide the requested function or service using the received result or may additionally process the received result to provide the requested function or service. To this end, for example, cloud computing, distributed computing, or client-server computing may be used.

Various embodiments of the present disclosure and terms used herein are not intended to limit the technologies described in the present disclosure to specific embodiments, and it should be understood that the embodiments and the terms include modification, equivalent, and/or alternative on the corresponding embodiments described herein. With regard to description of drawings, similar elements may be marked by similar reference numerals. The terms of a singular form may include plural forms unless otherwise specified. In the disclosure disclosed herein, the expressions "A or B", "at least one of A and/or B", "at least one of A and/or B", "A, B, or C", or "at least one of A, B, and/or C", and the like used herein may include any and all combinations of one or more of the associated listed items. Expressions such as "first," or "second," and the like, may express their elements regardless of their priority or importance and may be used to distinguish one element from another element but is not limited to these components. When an (e.g., first) element is referred to as being "(operatively or communicatively) coupled with/to" or "connected to" another (e.g., second) element, it may be directly coupled with/to or connected to the other element or an intervening element (e.g., a third element) may be present.

According to the situation, the expression "adapted to or configured to" used herein may be interchangeably used as, for example, the expression "suitable for", "having the capacity to", "changed to", "made to", "capable of" or "designed to". The expression "a device configured to" may mean that the device is "capable of" operating together with another device or other components. For example, a "processor configured to (or set to) perform A, B, and C" may mean a dedicated processor (e.g., an embedded processor) for performing corresponding operations or a generic-purpose processor (e.g., a central processing unit (CPU) or an application processor) which performs corresponding operations by executing one or more software programs which are stored in a memory device (e.g., the memory 930).

The term "module" used herein may include a unit, which is implemented with hardware, software, or firmware, and may be interchangeably used with the terms "logic", "logical block", "component", "circuit", or the like. The "module" may be a minimum unit of an integrated component or a part thereof or may be a minimum unit for performing one or more functions or a part thereof. The "module" may be implemented mechanically or electronically and may include, for example, an application-specific IC (ASIC) chip, a field-programmable gate array (FPGA), and a programmable-logic device for performing some operations, which are known or will be developed.

According to various embodiments, at least a part of an apparatus (e.g., modules or functions thereof) or a method (e.g., operations) may be, for example, implemented by instructions stored in a computer-readable storage media (e.g., the memory 930) in the form of a program module. The instruction, when executed by a processor (e.g., a processor 920), may cause the processor to perform a function corresponding to the instruction. The computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), an embedded memory, and the like. The one or more instructions may contain a code made by a compiler or a code executable by an interpreter.

Each element (e.g., a module or a program module) according to various embodiments may be composed of single entity or a plurality of entities, a part of the above-described sub-elements may be omitted or may further include other elements. Alternatively or additionally, after being integrated in one entity, some elements (e.g., a module or a program module) may identically or similarly perform the function executed by each corresponding element before integration. According to various embodiments, operations executed by modules, program modules, or other elements may be executed by a successive method, a parallel method, a repeated method, or a heuristic method, or at least one part of operations may be executed in different sequences or omitted. Alternatively, other operations may be added.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device that supports a speech recognition service, the electronic device comprising:
a display;
a microphone;
at least one speaker;
a wireless communication circuit;

a memory including at least one application; and a processor electrically connected to the display, the microphone, the at least one speaker, the wireless communication circuit, and the memory, wherein the processor is configured to:

receive an utterance of a user through the microphone, transmit data related to the utterance of the user to an external device through the wireless communication circuit, receive a response including sequence information of states of the electronic device from the external device through the wireless communication circuit, the sequence information of states of the electronic device including sequences for execution of functions of the at least one application or sequences for execution of applications stored in the memory in response to the utterance of the user, determine whether at least one of parameter information related to an ordinal or parameter information related to anaphora is present on the response, apply the parameter information to a screen output through the display at a second time point before a first time point at which a presence of the parameter information is determined while execution of a specific function among the functions or a specific application among the applications is performed in response to the sequence information, calculate an area allocated to a plurality of contents on the screen output at the second time point, and when areas or sizes of the plurality of contents is different from each other, or the plurality of contents is irregularly arranged, exclude application of the parameter information related to the ordinal.

2. The electronic device of claim 1, wherein the processor is further configured to:

map index information with unit contents determined according to the area.

3. The electronic device of claim 2, wherein the processor is further configured to:

apply the parameter information related to the ordinal to contents that, among the plurality of contents included on the screen output of the second time point, correspond to the parameter information related to the ordinal, based on the index information at the first time point.

4. The electronic device of claim 2, wherein the processor is further configured to:

apply the parameter information related to the anaphora to contents that, among the plurality of contents included on the screen output of the second time point, are selected in advance, at the first time point.

5. The electronic device of claim 2, wherein the processor is further configured to:

when an arrangement of the plurality of contents displayed on the screen output of the second time point, correspondingly change an arrangement of the index information.

6. The electronic device of claim 2, wherein the processor is further configured to:

compare an area of contents that, among the plurality of contents displayed on the screen output of the second time point, correspond to a periphery of an area allocated to the plurality of contents with an area of other contents.

7. The electronic device of claim 6, wherein the processor is further configured to:

when a ratio of the area of the contents corresponding to the periphery to the area for the other contents is a specific threshold ratio or less, exclude the index information for the contents corresponding to the periphery from the application of the parameter information related to the ordinal.

8. The electronic device of claim 2, wherein the processor is further configured to:

identify an attribute of the plurality of contents displayed on the screen output of the second time point, and determine application of the parameter information related to the ordinal for one or more contents including an attribute corresponding to the utterance of the user.

9. The electronic device of claim 1, wherein the processor is further configured to:

when the application of the parameter information related to the ordinal is excluded, request creation of a related feedback from an external server.

10. An electronic device comprising:

a housing;

a touchscreen display disposed in an interior of the housing and exposed through a first part of the housing;

a microphone disposed in the interior of the housing and exposed through a second part of the housing;

at least one speaker disposed in the interior of the housing and exposed through a third part of the housing;

a wireless communication circuit disposed in the interior of the housing;

a memory disposed in the interior of the housing, wherein the memory is configured to store an application program including a user interface for displaying one or a plurality of items; and a processor disposed in the interior of the housing and electrically connected to the display, the microphone, the at least one speaker, the wireless communication circuit, and the memory, wherein the processor is configured to:

display a user interface including the one or the plurality of items on the display, receive a first user utterance through the microphone while the user interface is displayed, wherein the first user utterance includes a first request for executing a first task by using at least one item that, among the one or the plurality of items, is specified by the first user utterance, transmit first data related to the first user utterance to an external server through the wireless communication circuit, receive a first response from the external server through the wireless communication circuit, wherein the first response includes information on a first sequence of states of the electronic device for executing the first task and the first response further includes numbers and locations of the one or the plurality of items in the user interface, the first sequence of states of the electronic device including sequences for execution of functions of the application program or sequences for execution of applications stored in the memory in response to the first user utterance, execute the first task including an operation of allowing the application program to select the at least one item based on the numbers or the locations while execution of a specific function among the functions or a specific application among the applications is performed in response to the first sequence, calculate an area allocated to the plurality of items in the user interface, and when areas or sizes of the plurality of items is different from each other, or the plurality of items is irregularly arranged, control the application program to exclude the numbers or the locations from the selection of the at least one item.

11. The electronic device of claim 10, wherein the application program includes at least one of a picture application program, a document editing application program, an address book application program, a music application program, and an application program or a mail application program related to control of setting of the electronic device.

12. The electronic device of claim 10, wherein the first user utterance includes at least one of an ordinal or anaphora.

13. The electronic device of claim 10, wherein the first response includes a medium parameter name or a slot value related to the one or the plurality of items.

14. The electronic device of claim 13, wherein the slot value includes a number.

15. A method for operating a speech recognition service of an electronic device, the method comprising:
receiving a user utterance and transmitting related data to an external device that performs communication with the electronic device;
receiving a response including sequence information of states of the electronic device from the external device, the sequence information of states of the electronic device including sequences for execution of functions of at least one application or sequences for execution of applications stored in a memory in response to the user utterance;
determining whether at least one of parameter information related to an ordinal or parameter information related to anaphora is present on the response; and
applying the parameter information to a screen output at a second time point before a first time point, at which presence of the parameter information is determined while execution of a specific function among the functions or a specific application among the applications is performed in response to the sequence information,
calculating an area allocated to a plurality of contents on the screen output at the second time point; and
when areas or sizes of the plurality of contents is different from each other, or the plurality of contents is irregularly arranged, excluding application of the parameter information related to the ordinal.

16. The method of claim 15, further comprising:
mapping index information with unit contents determined according to the area.

17. The method of claim 16, wherein the applying of the parameter information includes:
applying the parameter information related to the ordinal to contents that, among the plurality of contents included on the screen output of the second time point, correspond to the parameter information related to the ordinal, based on the index information at the first time point.

18. The method of claim 16, wherein the applying of the parameter information includes:
applying the parameter information related to the anaphora to contents that, among the plurality of contents included on the screen output of the second time point, are selected in advance, at the first time point.

* * * * *